United States Patent
Jia

(10) Patent No.: US 11,538,175 B2
(45) Date of Patent: Dec. 27, 2022

(54) METHOD AND APPARATUS FOR DETECTING SUBJECT, ELECTRONIC DEVICE, AND COMPUTER READABLE STORAGE MEDIUM

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 302 days.

(21) Appl. No.: 16/915,398

(22) Filed: Jun. 29, 2020

(65) Prior Publication Data
US 2021/0099646 A1    Apr. 1, 2021

(30) Foreign Application Priority Data

Sep. 29, 2019    (CN) .......................... 201910930662.1

(51) Int. Cl.
*G06T 7/254*    (2017.01)
*G06T 7/194*    (2017.01)
(Continued)

(52) U.S. Cl.
CPC ................ *G06T 7/254* (2017.01); *G06T 7/11* (2017.01); *G06T 7/194* (2017.01); *G06T 7/246* (2017.01); *G06T 7/269* (2017.01)

(58) Field of Classification Search
CPC . G06T 7/254; G06T 7/11; G06T 7/194; G06T 7/246; G06T 7/269;
(Continued)

(56) References Cited

U.S. PATENT DOCUMENTS

| 8,593,534 B2 | 11/2013 | Gardiner et al. |
| 2008/0246848 A1* | 10/2008 | Tsubaki ............. H04N 5/23264 348/208.4 |

(Continued)

FOREIGN PATENT DOCUMENTS

| CA | 3037360 A1 | 7/2018 |
| CN | 1973231 A | 5/2007 |

(Continued)

OTHER PUBLICATIONS

Chinese First Office Action with English Translation for CN Application 201910930662.1 dated Nov. 1, 2021. (17 pages).

(Continued)

*Primary Examiner* — Chan S Park
*Assistant Examiner* — Daniel C Chang
(74) *Attorney, Agent, or Firm* — Young Basile Hanlon & MacFarlane, P.C.

(57) ABSTRACT

The present disclosure relates to a method and an apparatus for detecting a subject, an electronic device, and a computer readable storage medium. The method includes the following. A current image and a previous image are obtained. A transformation matrix between the current image and the previous image is obtained in response to determining that the current image indicates the shaking state. The previous image is corrected based on the transformation matrix. The subject detection model is updated based on the corrected previous image. The subject detection is performed on the current image based on the updated subject detection model, to obtain a target subject.

18 Claims, 8 Drawing Sheets

(51) Int. Cl.
*G06T 7/11* (2017.01)
*G06T 7/269* (2017.01)
*G06T 7/246* (2017.01)

(58) Field of Classification Search
CPC .......... G06T 2207/20021; G06T 7/174; G06T 2207/10016; G06T 2207/20224; G06T 7/33; G06T 5/002; G06T 7/0002
See application file for complete search history.

(56) References Cited

U.S. PATENT DOCUMENTS

| 2013/0004079 | A1* | 1/2013 | Yamada | G06V 10/462 |
| | | | | 382/190 |
| 2015/0146022 | A1* | 5/2015 | Pham | G06T 7/207 |
| | | | | 348/208.4 |
| 2017/0213100 | A1* | 7/2017 | Yun | G06T 7/11 |
| 2018/0278737 | A1 | 9/2018 | Posa | |
| 2019/0172184 | A1 | 6/2019 | Pan | |

FOREIGN PATENT DOCUMENTS

| CN | 102025910 A | 4/2011 |
| CN | 102568002 A | 7/2012 |
| CN | 103150738 A | 6/2013 |
| CN | 104156978 A | 11/2014 |
| CN | 105976399 A | 9/2016 |
| CN | 205883405 U | 1/2017 |
| CN | 104469167 B | 10/2017 |
| CN | 106686308 B | 2/2018 |
| CN | 107730462 A | 2/2018 |
| CN | 108170817 A | 6/2018 |
| CN | 108205891 A | 6/2018 |
| CN | 108229475 A | 6/2018 |
| CN | 108470354 A | 8/2018 |
| CN | 108900778 A | 11/2018 |
| CN | 109089047 A | 12/2018 |
| CN | 109101944 A | 12/2018 |
| CN | 105847664 B | 1/2019 |
| CN | 109167910 A | 1/2019 |
| CN | 109978908 A | 7/2019 |
| CN | 110096935 A | 8/2019 |
| CN | 110660090 A | 1/2020 |

OTHER PUBLICATIONS

Extended European Search Report for EP application 20188063.0 dated Dec. 22, 2020.
ISR for PCT application PCTCN2020108519 dated Nov. 11, 2020.
CVABS Moving Object Segmentation with Conwon Vector Approach for Videos; Sahin Isik, Kemal Ozkan, Omer Nezih Gerek; Computer Engineering Department.
Moving Objects Detection in Video Sequences Captured by a PTZ Camera; Li Lin, Bin Wang, Fen Wu, Fengyin Cao; School of Communication and Information Engineering, Shanghai University.
Indian Examination Report for IN Application 202014034077 dated Sep. 15, 2021. (7 pages).
Moving Object Detection and Tracking from Video Captured by Moving Camera, YJVCI 1494, Journal of Visual Communication and Image Representation, Feb. 2, 2015.
Chinese First Office Action with English Translation for ON Application 201910930662.1 dated Apr. 22, 2022. (12 pages).

* cited by examiner

METHOD AND APPARATUS FOR DETECTING SUBJECT, ELECTRONIC DEVICE, AND COMPUTER READABLE STORAGE MEDIUM

CROSS-REFERENCE TO RELATED APPLICATION(S)

This application claims priority and benefits to Chinese Application No. 201910930662.1, filed on Sep. 29, 2019, the entire content of which is incorporated herein by reference.

TECHNICAL FIELD

The present disclosure relates to a field of computer technologies, and more particularly to a method and an apparatus for detecting a subject, an electronic device, and a computer readable storage medium.

BACKGROUND

With a development of the image technology, people are accustomed to capturing an image or a video and recording various information through an image collection device, such as a camera, provided on an electronic device. The electronic device, after obtaining the image, generally needs to perform a subject detection on the image to detect a subject, thereby obtaining an image having a clear subject.

SUMMARY

The present disclosure provides a method for detecting a subject. The method for detecting a subject includes: obtaining a current image and a previous image adjacent to the current image; obtaining a transformation matrix between the current image and the previous image in response to detecting that the current image indicates a shaking state; correcting the previous image based on the transformation matrix to obtain a corrected previous image; and updating a subject detection model based on the correct previous image to obtain an updated body detection model, and performing a subject detection on the current image based on the updated body detection model updated, to obtain a target subject.

The present disclosure provides an electronic device. The electronic device includes a processor and a memory. The memory is configured to store a computer program. The processor is configured to execute the above method for detecting a subject when executing the computer program.

The present disclosure provides a non-transitory computer readable storage medium. The computer readable storage medium has a computer program stored thereon. The above method for detecting a subject is implemented when the computer program is executed by a processor.

BRIEF DESCRIPTION OF DRAWINGS

In order to more clearly illustrate technical solutions in embodiments of the present disclosure or the related art, a brief description will be made below to accompanying drawings. Obviously, the accompanying drawings in the following descriptions are only some embodiments of the present disclosure, and for the skilled in the art, other accompanying drawings may be obtained according to these accompanying drawings without creative labor.

DETAILED DESCRIPTION

In order to enable the objective, technical solutions and advantages of the present disclosure clearer, a further description will be made in detail below to the present disclosure with reference to accompanying drawings and embodiments. It should be understood that, the detailed embodiments described herein are only for the purpose of explaining the present disclosure, and are not intended to limit the present disclosure.

It should be understood that, the terms "first", "second" and the like used in the present disclosure may be used herein to describe various elements, but these elements are not limited by these terms. These terms are only used to distinguish the first element from another element. For example, without departing from the scope of the present disclosure, a first pixel value vector may be referred as a second pixel value vector, and similarly, the second pixel value vector may be referred as the first pixel value vector. Both the first pixel value vector and the second pixel value vector are pixel value vectors, but not the same pixel value vector.

Figure 1:
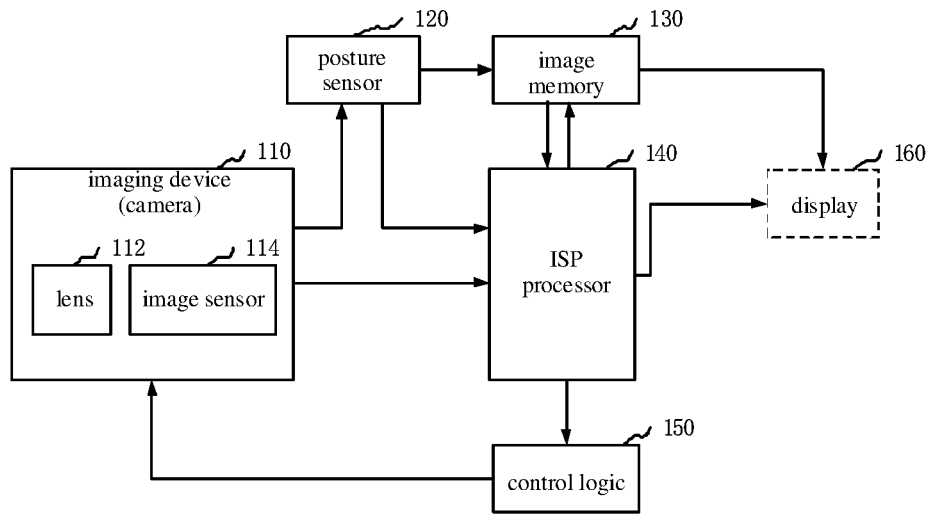
FIG. 1 is a schematic diagram illustrating an image processing circuit according to an embodiment.

Embodiments of the present disclosure provide an electronic device. The electronic device includes an image processing circuit. The image processing circuit may be implemented using hardware and/or software components, and may include various processing units that define an ISP (image signal processing) pipeline. FIG. 1 is a schematic diagram illustrating an image processing circuit according to an embodiment. As illustrated in FIG. 1, for ease of explanation, only aspects of an image processing technology related to embodiments of the present disclosure are illustrated.

As illustrated in FIG. 1, the image processing circuit may include an ISP processor 140 and a control logic 150. Image data captured by an imaging device 110 may be processed by the ISP processor 140 firstly. The ISP processor 140 may be configured to analyze the image data to obtain image statistical information that may be used to determine one or more control parameters of the imaging device 110. The imaging device 110 may include a camera having one or more lenses 112 and an image sensor 114. The image sensor 114 may include an array of color filters (e.g., color filters arranged in the Bayer array, or Bayer filters). The image sensor 114 may obtain light intensity and wavelength information captured by each imaging pixel of the image sensor 114 and provide a set of raw image data that may be processed by the ISP processor 140. A posture sensor 120 (e.g., a triaxial gyroscope, a Hall sensor, or an accelerometer) may provide the collected parameters of image processing (e.g., an anti-shake parameter) to the ISP processor 140 based on an interface type of the posture sensor 120. The interface of the posture sensor 120 may be an SMIA (standard mobile imaging architecture) interface, other serial or parallel camera interface, or a combination thereof.

In addition, the image sensor 114 may also send the raw image data to the posture sensor 120. The posture sensor 120 may provide the raw image data to the ISP processor 140 based on the interface type of the posture sensor 120, or the posture sensor 120 may store the raw image data in an image memory 130.

The ISP processor 140 may be configured to process the raw image data, pixel by pixel, in various ways. For example, each image pixel may have a bit depth of 8, 10, 12, or 14 bits. The ISP processor 140 may be configured to perform one or more image processing operations on the raw image data and obtain the statistical information about the image data. The image processing operations may be performed with the same or different accuracies of the bit depth.

The ISP processor 140 may be configured to further receive image data from the image memory 130. For example, the raw image data may be sent through the interface of the posture sensor 120 to the image memory 130, and the raw image data is provided by the image memory 130 to the ISP processor 140 for processing. The image memory 130 may be a part of a memory device, a storage device, or a dedicated memory separated in an electronic device, and may include features related to DMA (direct memory access).

Upon receiving the raw image data from the interface of the image sensor 114, from the interface of the posture sensor 120 or from the image memory 130, the ISP processor 140 may be configured to perform the one or more image processing operations, such as time-domain filtering. The processed image data may be sent to the image memory 130 for other processing before being displayed. The ISP processor 140 may receive the processed image data from the image memory 130 and perform image data processing on the processed image data in an original domain and in color spaces of RGB (red, green, blue) and YCbCr. The processed image data from the ISP processor 140 may be output to a display 160 for displaying to a user and/or may be processed by a graphics engine or a GPU (graphics processing unit). In addition, the output from the ISP processor 140 may also be sent to the image memory 130, and the display 160 may read the image data from the image memory 130. In an embodiment, the image memory 130 may be configured as one or more frame buffers.

The statistical data determined by the ISP processor 140 may be sent to a control logic 150. For example, the statistical data may include the statistical information of the image sensor 114, such as a vibration frequency of a gyroscope, automatic exposure, automatic white balance, automatic focusing, flicker detection, black level compensation, shadow correction of the lens 112, and the like. The control logic 150 may include a processor and/or a microcontroller that executes one or more routines (e.g., firmware). The one or more routines may determine control parameters of the imaging device 110 and control parameters of the ISP processor 140 based on received statistical data. For example, the control parameters of the imaging device 110 may include control parameters (e.g., a gain, an integration time of exposure control, an anti-shake parameter, etc.) of the posture sensor 120, a flash control parameter of a camera, an anti-shake displacement parameter of the camera, control parameters of the lens 112 (e.g., focal length for focusing or zooming), or a combination thereof. The control parameters of the ISP processor 140 may include a gain level and a color correction matrix for automatic white balance and color adjustment (e.g., during RGB processing), and a shadow correction parameter for the lens 112.

In an example, a current image and a previous image adjacent to the current image are obtained through the lens 112 and the image sensor 114 of the imaging device (camera) 110. The current image and the previous image are transmitted to the ISP processor 140. The ISP processor 140 detects whether the current image indicates a shaking state after receiving the current image and the previous image. The ISP processor 140 obtains a transformation matrix between the current image and the previous image in response to detecting that the current image indicates the shaking state and corrects the previous image based on the transformation matrix to obtain a corrected previous image. The corrected previous image is more similar to the current image than the previous image. The ISP processor 140 updates a subject detection model based on the corrected previous image to obtain an updated subject detection model, and performs a subject detection on the current image based on the updated body detection model. Therefore, a target subject may be obtained accurately, thereby increasing the accuracy of the subject detection.

The ISP processor may be configured to send the target subject to the control logic 150 after obtaining the target subject of the current image. After the target subject is obtained, the control logic 150 may be configured to control the lens 112 of the imaging device (e.g., camera) 110 to move and focus on a position of the target subject. Therefore, the target subject of a next image may be clearer than the current image and the next image may be sent to the ISP processor 140. After receiving the next image, the ISP processor 140 may be configured to use the current image as a previous image and the next image as the current image, and the ISP processor 140 may be configured to obtain a pair of target points from the current image and the previous image in response to detecting that the current image indicates the shaking state. A target video including a clear target subject may be generated based on each corrected image.

Figure 2:
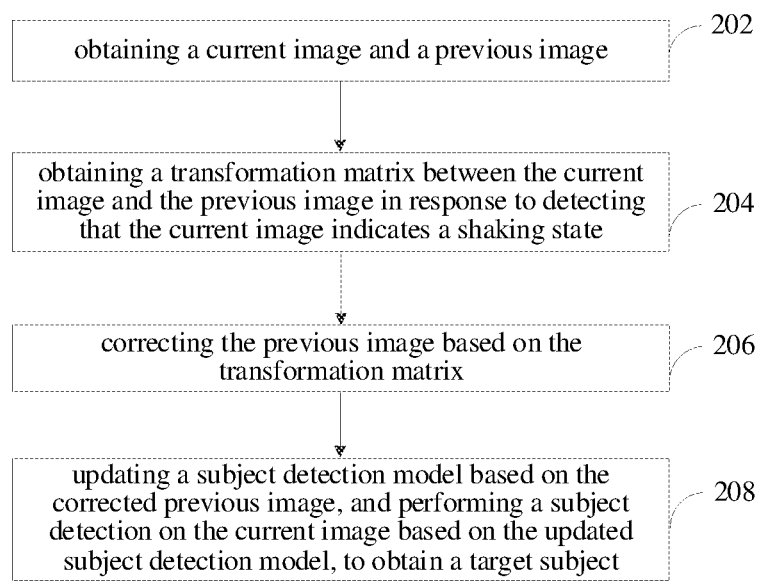
FIG. 2 is a flow chart illustrating a method for detecting a subject according to an embodiment.

FIG. 2 is a flow chart illustrating a method for detecting a subject according to an embodiment. As illustrated in FIG. 2, the method may include blocks 202-208.

At block 202, a current image and a previous image adjacent to the current image are obtained.

The current image refers to an image obtained at a current time. The previous image refers to an image adjacent to the current image and obtained at a previous moment adjacent to the current time. Both the current image and the previous image may be an RGB image, a grayscale image, a depth image, an image corresponding to Y component of YUV. The "Y" component of the YUV represents luminance (or, luma), i.e., a gray-scale value, while the "U" and "V" component represent chrominance (or chroma), for describing a color and a saturation of an image and to specify a color of a pixel.

In examples of the present disclosure, both the current image and the previous image may be captured by the electronic device. The electronic device may be disposed with cameras. For example, the electronic device may be disposed with one or more cameras, such as, 1, 2, 3, or 5 cameras, which is not limited thereto. How to dispose the camera on the electronic device is not limited in the present disclosure. For example, the camera may be built in the electronic device, or externally disposed to the electronic device. The camera may be a front camera or a rear camera.

The current image and the previous image may be captured by a same camera or different cameras of the electronic device, which is not limited. The camera of the electronic device may be any type of camera. For example, the camera may be a color camera, a black-and-white camera, a depth camera, a telephoto camera, a wide-angle camera, etc., which is not limited thereto.

Correspondingly, a color image, namely an RGB image, may be obtained through the color camera. A grayscale image may be obtained through the black-and-white camera. A depth image may be obtained through the depth camera. A telephoto image may be obtained through the telephoto camera. A wide-angle image may be obtained through the wide-angle camera. The present disclosure is not limited in this aspect. The cameras of the electronic device may be of the same type or of different types. For example, all the cameras may be the color cameras or the black-and-white cameras. As another example, one of the cameras may be the telephoto camera, and the other cameras are the wide-angle cameras. The present disclosure is not limited in this aspect.

In detail, the electronic device may store the captured images in a first-in-first-out queue based on a sequence of capturing times of the images, and obtain the current image and the previous image from the first-in-first-out queue.

The first-in-first-out queue refers to that a firstly stored image is output firstly. The electronic device may obtain the previous image from the first-in-first-out queue, and obtain the current image from the first-in-first-out queue after obtaining the previous image.

In another example, a current capturing time and a previous capturing time may be obtained. The current image is obtained based on the current capturing time. The previous image is obtained based on the previous capturing time.

The electronic equipment may obtain a capturing frequency and the current capturing time. The previous capturing time may be obtained based on the current capturing time and the capturing frequency. For example, the current capturing time is 15:45:56.200, and the capturing frequency is 10 frames/second, i.e., the images are captured every 100 ms. The previous capturing time may be obtained as 15:45:56.100. The current image is obtained based on the current capturing time, and the previous image is obtained based on the previous capturing time.

In an example, down-sampling processing may be performed on the current image and the previous image to obtain the current image with a reduced size and the previous image with a reduced size, to save a calculation amount of computer processing.

In an example, filtering processing may be performed on the current image and the previous image, to filter out high-frequency noise carried by a complex background with a large amount of texture details from the current image and the previous image, or to filter out high-frequency noise caused by the down-sampling processing, to obtain a more accurate current image and a more accurate previous image, thereby allowing to reduce false subject detection. The filtering processing may be at least one of a Gaussian filtering processing, a smooth filtering processing, a bilateral filtering processing, and the like. The down-sampling processing refers to sampling the image at an interval of multiple pixel points to obtain a new image.

At block 204, a transformation matrix between the current image and the previous image is obtained in response to detecting that the current image indicates a shaking state.

The current image may be blurred under the case that the current image indicates the shaking state. The current image may be clearer under the case that the current image does not indicate the shaking state, that is, the current image indicates a stable state.

In an example, when the camera of the electronic device is in a motion state, the current image captured by the camera may be blurred. That is, the current image indicates the shaking state. In another example, when the subject photographed by the camera is in a motion state, the current image captured by the camera is blurred. That is, the current image indicates the shaking state.

The transformation matrix is a matrix representing transforms from pixel points of the previous image to pixel points of the current image. For example, a position of a feature point of the previous image is (200,50), and a position of the corresponding feature point in the current image to the feature point of the previous image is (200,100). The transformation matrix may represent the transform from the feature point of the previous image located at (200, 50) to the feature point of the current image at (200,100).

At block 206, the previous image is corrected based on the transformation matrix to obtain a corrected previous image.

In detail, a first position coordinate of each pixel point of the previous image may be obtained. The first position coordinate of each pixel point of the previous image may be multiplied by the transformation matrix to obtain a second position coordinate of each pixel point. The corrected previous image may be generated based on the second position coordinate of each pixel point.

The first position coordinate refers to a position coordinate of each pixel point of the previous image before the correcting. The second position coordinate refers to a position coordinate of each pixel point of the previous image after the correcting. The position coordinate such as (200, 50) represents a position with an abscissa of 200 and an ordinate of 50.

In an example, there may be some noise in the corrected previous image. The filtering processing may be performed on the corrected previous image to remove the noise and obtain a more accurate previous image. The filtering processing may be at least one of the Gaussian filtering processing, the smooth filtering processing, the bilateral filtering processing, and the like.

At block 208, a subject detection model is updated based on the corrected previous image to obtain an updated subject detection model, and a subject detection is performed on the current image based on the updated subject detection model, to obtain a target subject.

The subject detection model refers to a model for performing the subject detection on an image to obtain the target subject. In the subject detection model, multiple parameters for the subject detection may be included, such as, a pixel value mean of pixel points in the background region, a pixel value variance of pixel points in the background region, a color mean of a subject region, a color variance of the subject region, and the like. The subject detection (also called as a salient object detection) refers to automatically processing an interested region and selectively ignoring an uninterested region of a scenario. The interested region is the target subject. The target subject refers to respective objects, such as flowers, cats, dogs, cattle, blue sky, white clouds, background, etc.

In detail, the respective pixel value of each pixel point of the corrected previous image is obtained. Target parameters of the subject detection model are determined based on the pixel values of each pixel point of the corrected previous image. Each parameter of the object detection model is updated based on the target parameters.

The target parameters may include a pixel value mean for each pixel point of the background region in the previous image, a pixel value variance for each pixel point of the background region in the previous image, a color mean of the subject region in the previous image, and a color variance of the subject region in the previous image, which are not limited thereto.

It should be understood that, in a conventional subject detection method, when the camera moves or the subject to be photographed moves, it is difficult to detect the subject from the image, or the subject is detected inaccurately.

In the present disclosure, the current image and the previous image are obtained, the transformation matrix between the current image and the previous image is obtained in response to detecting that the current image indicates the shaking state, the previous image is corrected based on the transformation matrix, in which the corrected previous image is more similar to the current image than the previous image, the subject detection model is updated based on the corrected previous image, and the subject detection may be performed more accurately on the current image based on the updated subject detection model, to obtain a more accurate target subject, thereby improving the accuracy of the subject detection.

In an example, a method for determining whether the current image indicates the shaking state may include the following. The current image is compared with the previous image to obtain a scenario variation value corresponding to the current image. The scenario variation value represents a variation degree of the scenario between the current image and the previous image. It is determines that the current image indicates the shaking state under a case that the scenario variation value is greater than a threshold.

The scenario variation value may be obtained based on an AF (automatic focus) module.

In detail, the AF module may obtain respective pixel values of each pixel point included in the current image, and respective pixel values of each pixel point included in the previous image. Each pixel point of the current image corresponds to each pixel point of the previous image one by one. A difference processing may be performed on the pixel value of each pixel point of the current image and the pixel value of each corresponding pixel point of the previous image, to obtain a difference value at each pixel point. A sum of each difference value is calculated as the scenario variation value.

The pixel value of each pixel point may be a grayscale value for representing a brightness of each pixel point. The higher the grayscale value, the greater the brightness of the pixel point is. The lower the grayscale value, the less the brightness of the pixel point is. For example, when the grayscale value of the pixel point is 255, i.e. corresponding to the color of white, the brightness of the pixel point is the maximum. When the grayscale value of the pixel point is 0, i.e. corresponding to the color of black, the brightness of the pixel point is the minimum. A sum of variations of the brightness between the current image and the previous image is calculated as the scenario variation degree between the current image and the previous image. The larger the sum, the greater the scenario variation degree between the current image and the previous image is. The smaller the sum, the smaller the scenario variation degree between the current image and the previous image is.

The number of pixel points included in the current image is the same as the number of pixel points included in the previous image, and each pixel point included in the current image corresponds to each pixel point included in the previous image one by one. For example, the pixel point located at an intersection of the $5^{th}$ row and the $6^{th}$ column of the current image corresponds to the pixel point located at the intersection of the $5^{th}$ row and $6^{th}$ column of the previous image. The pixel point located at the intersection of the $100^{th}$ row and the $50^{th}$ column of the current image corresponds to the pixel point located at the intersection of the $100^{th}$ row and the $50^{th}$ column of the previous image.

The difference processing is performed on the pixel value of each pixel point of the current image and the pixel value of each pixel point of the previous image, to obtain respective difference values. For example, the pixel value of the pixel point at the intersection of the $5^{th}$ row and the $6^{th}$ column of the current image is 150, and the pixel value of the corresponding pixel point at the intersection of the $5^{th}$ row and the $6^{th}$ column of the previous image is 120. The difference value may be obtained as 150−120=30. As another example, the pixel value of the pixel point at the intersection of the $100^{th}$ row and the $50^{th}$ column of the current image is 50, and the pixel value of the corresponding pixel point at the intersection of the $100^{th}$ row and the $50^{th}$ column of the previous image is 75. The difference value may be calculated as 50−75=−25. An absolute value is determined for each difference value and the absolution value of the difference values may be summed up.

With the above method for detecting a subject, the current image is compared with the previous image, to obtain the scenario variation value corresponding to the current image. When the scenario variation value is greater than the threshold, it is indicated that the scenario variation degree between the current image and the previous image is large, and it is determined that the current image indicates the shaking state. The method may improve accuracy of determining whether the current image indicates the shaking state.

In an example, determining that the current image indicates the shaking state may include the following. Difference processing is performed on the current image and the previous image and a binarization processing is performed to obtain a binary difference image. A sum is calculated for pixel value of each pixel point of the binary difference image. It is determined that the current image indicates the shaking state under a case that the sum is greater than a sum threshold.

The difference processing refers to subtracting the pixel value of each pixel point of the current image from the pixel value of each corresponding pixel point of the previous image. The binarization processing refers to limiting the pixel value of the pixel point to be one of two values. For example, the pixel value may be limited to be either 0 or 255. As another example, the pixel value may be limited to be either 0 or 1, or to be another value, which is not limited thereto.

In detail, the pixel value of each pixel point included in the current image and the pixel value of each pixel point included in the previous image are obtained. Each pixel point of the current image corresponds to each pixel point of the previous image one by one. The difference processing is respectively performed on the pixel value of each pixel point of the current image and the pixel value of each corresponding pixel point of the previous image, to obtain respective difference values of each pixel point. A first value of the binarization processing is generated under a case that the difference value is smaller than a difference threshold. A second value of the binarization processing is generated under a case that the difference value is greater than or equal to the difference threshold. The second value may be greater than the first value. A sum of each first value and each second value is calculated.

When the difference value of a pixel point is smaller than the difference threshold, it may be considered that the pixel point at a position is same in the previous image as in the current image. That is, the pixel point at this position indicates no shaking in the current image with respect to the previous image. In this case, the pixel point at this position is set to the first value. When the difference value of a pixel point is greater than or equal to the difference threshold, it may be considered that the pixel point at a position is different in the current image from in the previous image. That is, the pixel point at this position indicates occurrence of shaking in the current image with respect to the previous image. In this case, the pixel point at this position is set to the second value.

For example, the pixel value of the pixel point at the intersection of the $10^{th}$ row and the $48^{th}$ column of the current image is 40, and the pixel value of the corresponding pixel point at the intersection of the $10^{th}$ row and the $48^{th}$ column of the previous image is 45, and the difference threshold value is 20. The difference value of the pixel point at the intersection of the $10^{th}$ row and the $48^{th}$ column is 5, which is smaller than the difference threshold 20. It may be considered that the pixel point at the intersection of the $10^{th}$ row and $48^{th}$ column of the current image indicates no shaking in the current image with respect to the previous image. The pixel value of the pixel point at the intersection of the $20^{th}$ row and the $48^{th}$ column may be set to the first value, in the binary difference image.

As another example, the pixel value of the pixel point at the intersection of the $55^{th}$ row and the $80^{th}$ column of the current image is 100, the pixel value of the corresponding pixel point at the intersection of the $55^{th}$ row and the $80^{th}$ column of the previous image is 220, and the difference threshold is 20. The difference value of the pixel point at the intersection of the $55^{th}$ row and the $80^{th}$ column is 120, which is greater than the difference threshold 20. It may be considered that the pixel point at the intersection of the $55^{th}$ row and the $80^{th}$ column indicates the shaking in the current image with respect to the previous image. In this case, the pixel value of the pixel point at the intersection of the $55^{th}$ row and the $80^{th}$ column in the binary difference binarization image is set to the second value.

In one example, the first value may be 0, and the second value may be 1. In another example, the first value may be 0, and the second value may be 255. In other examples, the first value and the second value may be set to other values, which are not limited.

The pixel value of each pixel point in the binary difference image is either the first value or the second value. A sum of each first value and each second value may be obtained, as the sum of pixel values of each pixel point of the binary difference image. When the sum of pixel values of each pixel point in the binary difference image is greater than the sum threshold, it may be determined that a relatively great difference exists between each pixel point of the current image and each corresponding pixel point of the previous image, and it may be considered that the current image indicates the shaking state.

With the above method for detecting a subject, the difference processing is performed on the current image and the previous image and the binarization processing is performed to obtain the binary difference image, the sum of pixel values of each pixel point in the binary difference image is calculated. When the sum is greater than the sum threshold, it may be determined that there is a relatively large difference between the pixel value of each pixel point of the current image and the pixel value of each pixel point of the previous image and it may be determined that the current image indicates the shaking state. The method may improve accuracy of determining whether the current image indicates the shaking state.

In an example, the filtering processing may be performed on the current image and the previous image, to obtain more accurate images. The filtering processing may be at least one of the Gaussian filtering processing, the smooth filtering processing, the bilateral filtering processing, and the like.

In an example, morphological processing may be performed on the binary difference image to obtain a more accurate binary difference image. The morphological processing may include erosion, dilation, etc.

In mathematics, the dilation or erosion operation is to convolve an image (or a part of the image, called as A) with a kernel (called as B). The kernel may be of any shape and size and has a reference point that is individually defined (called as anchorpoint). For example, the kernel may be a full-value kernel shaped of a small square with a reference point at the center and filled with non-zero values, or the kernel may also be a kernel shaped of a small disk with a reference point at the center and filled with non-zero values.

The dilation refers to convolving B with A to calculate a maximum value of pixel point in a region covered by B, and assigning the maximum value to the pixel designated by the reference point. A highlight region of the image may be gradually increased by the dilation.

The erosion refers to convolving B with A to calculate a minimum value of pixel point in the region covered by B, and assigning the minimum value to the pixel designated by the reference point. A dark region in the image may be gradually increased by the erosion.

By performing the morphological processing on the binary difference image, noise may be reduced from the binary difference image, and the number of voids in the binary difference image may be reduced.

Figure 3:
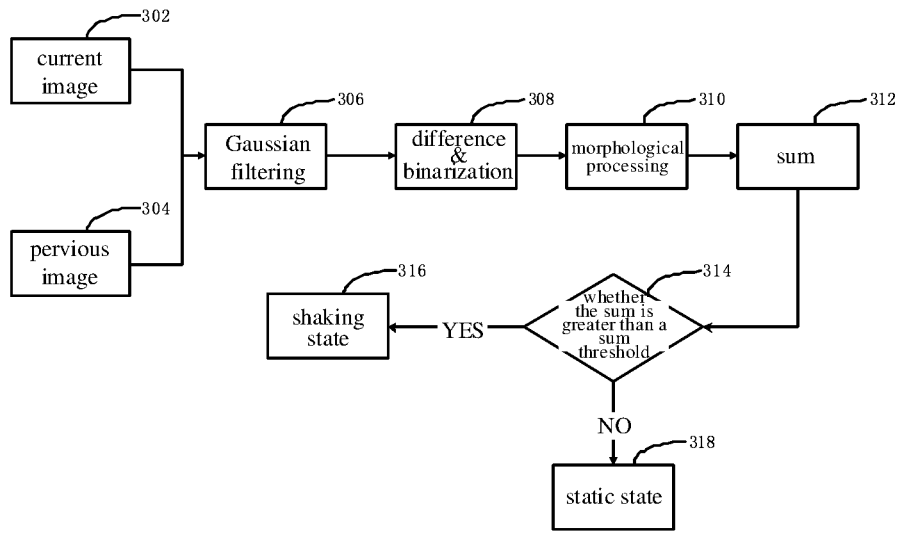
FIG. 3 is a schematic diagram illustrating judgement on whether a current image indicates a shaking state according to an embodiment.

In an example, as illustrated in FIG. 3, the current image 302 is obtained and the previous image 304 is obtained. A block 306, i.e. a Gaussian filter processing, is performed on the current image 302 and the previous image 304, to obtain a more accurate current image and a more accurate previous image. A block 308, i.e., the difference processing, is performed on the current image and the pervious image subjected to the Gaussian filter processing, and the binarization processing is performed on the image subjected to the difference processing, to obtain a binary difference image. A block 310, i.e., a morphological processing, is performed on the binary difference image, to obtain a more accurate binary difference image. At block 312, a sum of pixel value of each pixel point in the binary difference image subjected to the morphological processing is calculated. At block 314, it is determined whether the sum is greater than a sum threshold. At block 316, when the sum is greater than the sum threshold, the current image indicates the shaking state. At block 318, when the sum is smaller than or equal to the sum threshold, the current image indicates the static state.

In an example, determining that the current image indicates the shaking state may include the following. A pixel value of each pixel point included in the current image is obtained. A pixel value of each pixel point included in the previous image is obtained. A first vector of pixel values is generated for the current image based on the pixel value of each pixel point included in the current image. The first vector of pixel values represents a distribution of each pixel value of the current image. A second vector of pixel values is generated for the previous image based on the pixel value of each pixel point included in the previous image. The second vector of pixel values represents a distribution of each pixel value of the previous image. A vector distance between the current image and the previous image is determined based on the first vector of pixel values and the second vector of pixel values. It is determined that the current image indicates the shaking state under a case that the vector distance is greater than a distance threshold.

In detail, the pixel value of each pixel point included in the current image may be obtained, the number of pixel points having respective pixel values may be counted to generate a histogram of the pixel values of the current image. For example, the number of pixel points having the pixel value of 150 is 100, and the number of pixel points having the pixel value of 255 is 50. In other examples, a bar chart of pixel values and a pie chart of pixel values may also be generated, which is not limited thereto.

In addition, the pixel value of each pixel point included in the previous image may be obtained, the number of pixel points having respective pixel values may be counted, to generate a histogram of the pixel values for the previous image. In other example, a bar chart of pixel values and a pie chart of pixel values may be generated, which is not limited thereto.

The first vector of pixel values may be generated for the current image based on the number of pixel points having respective pixel values of the current image. The first vector of pixel values may have 256 dimensions, e.g., 256 dimensions corresponds to pixel values from 0 to 255. The first vector of pixel values may be (10, 50, 65, . . . 30, 56, 84). Each value of the first vector of pixel values may represent the number of pixel points having the corresponding pixel value. For example, the value of 10 may represent that the number of pixel points having the pixel value of 0 is 10, the value of 50 may represent that the number of pixel points having the pixel value of 1 is 50, the value of 56 may represent that the number of pixel points having the pixel value of 254 is 56, and the value of 84 may represent that the number of pixel points having the pixel value of 255 is 84.

In addition, a second vector of pixel values may be generated for the previous image based on the number of pixel points having respective pixel value of the previous image. The second vector of pixel values may have 256 dimensions, e.g., the 256 dimensions respectively correspond to the pixel values from 0 to 255.

After the first vector of pixel values and the second vector of pixel values are obtained, the an operation may be performed on the first vector of pixel values and the second vector of pixel values to determine a vector distance between the current image and the previous image. The first vector of pixel values represents the distribution of pixel values of the current image, and the pixel value represents a color of the pixel point. That is, the first vector of pixel values is used to represent a color distribution of the current image. Similarly, the second vector of pixel values is used to represent a color distribution of the previous image. Therefore, the vector distance is used to represent a color difference degree between the current image and the previous image.

When the vector distance is greater than the distance threshold, a relatively large color difference degree exists between the current image and the previous image. Therefore, it may be considered that the current image indicates the shaking state.

With the above method for detecting a subject, the first vector of pixel values is generated for the current image based on the pixel value of each pixel point included in the current image, the second vector of pixel values is generated for the previous image based on the pixel value of each pixel point included in the previous image, and the color difference degree between the current image and the previous image is determined based on the first vector of pixel values and the second vector of pixel values. That is, the vector distance between the current image and the previous image is obtained. When the vector distance is greater than the distance threshold, it is determined that a relatively large color difference degree exists between the current image and the previous image, and it is considered that the current image indicates the shaking state. Therefore, the method may improve accuracy for determining whether the current image indicates the shaking state.

In an example, obtaining the transformation matrix between the current image and the previous image in response to detecting that the current image indicates the shaking state may include the following. A pair of target points is obtained from the current image and the previous image under the case that the current image indicates the shaking state. The transformation matrix between the current image and the previous image based on the pair of target points.

The pair of target points refers to a pair of points consisted of a point of the current image and a corresponding point of the previous frame. The pair of target points may be pixel points or regions each including multiple pixel points (the region is used as a feature point). Two points obtained randomly from the current image and the previous image respectively may be used as the pair of target points, which are not limited thereto. For example, the pixel point at the intersection of the $5^{th}$ row and the $29^{th}$ column of the current image and the pixel point at the intersection of the $5^{th}$ row and the $29^{th}$ column of the previous image may form the pair of target points. As another example, a feature point related to a nasal tip in the current image and a feature point related to the nasal tip in the previous image may form the pair of target points.

There may be one or more pairs of target points, which is not limited in the present disclosure. It may be understood that, the more the number of pair of target points, the more accurate the transformation matrix determined based on the pair of target points is.

In detail, the position of each point of the pair of target points is obtained. The transformation matrix between the current image and the previous image is obtained based on the position of each point included in each pair of target points.

Variables in the transformation matrix may be set in advance. When there are four variables in the transformation matrix, four equations are needed and four pair of target points are needed. The position of the pixel point in the previous image, corresponding to each pair of target points, is multiplied with a preset transformation matrix, to obtain the position of the pixel point in the current image, and thus the four equations are obtained. Therefore, the four variables set in advance in the transformation matrix may be solved to obtain the transformation matrix.

With the above method for detecting a subject, the pair of target points may be obtained from the current image and the previous image in response to detecting that the current image indicates the shaking state and a more accurate transformation matrix between the current image and the previous image may be obtained based on the pair of target points.

In an example, the pair of target points may include at least one of a pair of tracking points and a pair of matching points.

The pair of target points may include the pair of tracking points only, may include the pair of matching points only, or may include both the pair of tracking points and the pair of matching points.

Figure 4:
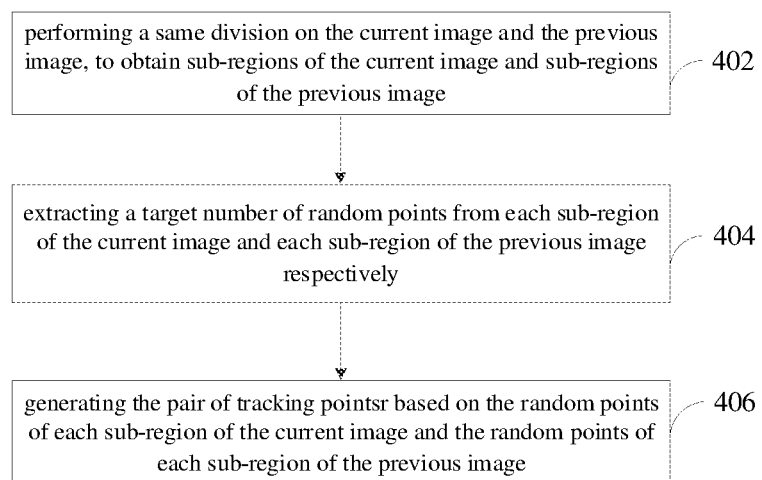
FIG. 4 is a flow chart illustrating generation of a pair of tracking points according to an embodiment.

In an example, as illustrated in FIG. 4, generation of the pair of tracking points may include the following.

At block 402, a same division is performed on both the current image and the previous image, to obtain sub-regions of the current image and sub-regions of the previous image.

The same division refers to dividing the current image and the previous image in the same manner such that the number of sub-regions of the current image equals to the number of sub-regions of the previous image. That is, the sub-regions of the current image corresponds to respective sub-regions of the previous image one by one. For example, the current image is divided into 3×3 sub-regions adjacent to each other, the previous image is also divided into the 3×3 sub-regions adjacent to each other, same to the current image.

The number of sub-regions is obtained. The same division is performed on the current image and the previous image based on the number of the sub-regions to obtain the sub-regions of the current image and the sub-regions of the previous image. It may be understood that, more sub-regions indicate that the division of the image is finer and obtaining the pair of tracking points is more accurate.

At block 404, a target number of random points are extracted respectively from the sub-regions of the current image and the sub-regions of the previous image.

The random points may be extracted randomly from the sub-regions. The target number of random points extracted from the sub-regions may be one or more.

In detail, 10 random points may be randomly extracted from a first sub-region of the current image and 10 random points are randomly extracted from a first sub-region of the previous image. As another example, 5 random points may be randomly extracted from a third sub-region of the current image and 5 random points are randomly extracted from a third sub-region of the previous image.

At block 406, the pair of tracking points is formed from the random points extracted from each sub-region of the current image and the random points extracted from each sub-region of the previous image.

When a random point is extracted from the sub-region of the current image, a random point is also extracted from the corresponding sub-region of the previous image, such that the extracted two random points form the pair of tracking points. When N random points are extracted from the sub-region of the current image, at least two random points are also extracted from the corresponding sub-region of the previous image, such that the pair of tracking points may be formed from a first random point randomly extracted from the sub-region of the current image and a first random point randomly extracted from the corresponding sub-region of the previous image, and the pair of tracking points may be formed from a $n^{th}$ random point randomly extracted from the sub-region of the current image and the $n^{th}$ random point randomly extracted from the corresponding sub-region of the previous image.

With the above method of detecting a subject, the pair of tracking points is generated by extracting the random points, to improve randomness of the pair of target points, and avoid a problem that accuracy of a subsequently obtained transformation matrix is low due to less pair of target points in a weak-texture region. In this way, the extracted pair of target points may have a good global distribution, and the accuracy of transformation matrix may be improved, thereby improving the accuracy of the subject detection.

Figure 5:
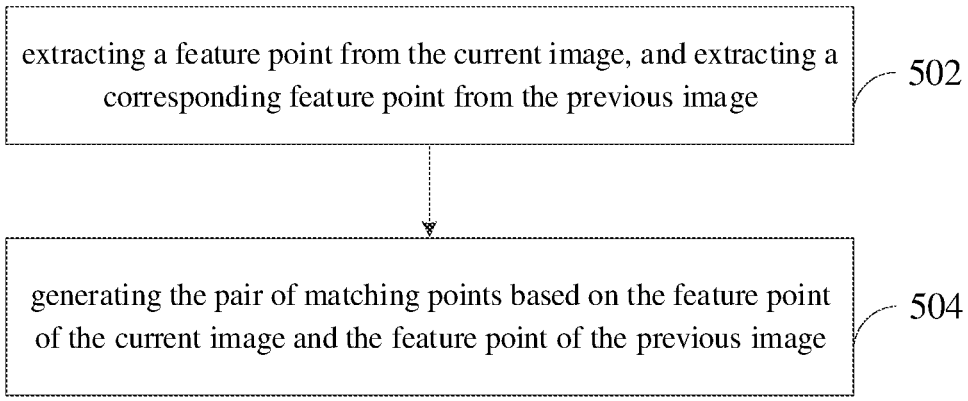
FIG. 5 is a flow chart illustrating generation of a pair of matching points according to an embodiment.

In an example, as illustrated in FIG. 5, generation of the pair of matching points may include the following.

At block 502, a feature point is extracted from the current image, and a corresponding feature point is extracted from the previous image.

The feature point refers to a point where the grayscale value of the image changes greatly or a point where a large curvature occurs at image edges (i.e. an intersection of two edges). The feature point may be such as an eye, a nasal tip, a corner of a mouth, a mole, an object center and the like, which is not limited thereto.

In detail, the grayscale value of each pixel point in the current image is detected. When a difference value between the grayscale values of adjacent pixel points is greater than a threshold, the region at which the adjacent pixel points are located may be taken as the feature point.

In an example, the corresponding feature point may be extracted from the previous image based on the feature point in the current image. In another example, the grayscale value of each pixel point in the previous image may also be detected. When the difference value between the grayscale values of adjacent pixel points is greater than the threshold, the region where the adjacent pixel points are located may be taken as the feature point. A correspondence may be established between the feature point in the previous image and the feature point in the current image.

In an example, a target region may be obtained. The feature point may be extracted from the target region of the current image. The corresponding feature point may be extracted from the target region of the previous image.

It may be understood that, the target region may be a center region of the image. Generally, a subject of the image or an object photographed by a user may be located at the center region of the image. Therefore, the feature points may be extracted from the center region of the current image, and from the center region of the previous image respectively. In this way, not only a calculation amount of the electronic device may be saved, but also the accuracy of the extracted feature point is improved.

At block 504, the pair of matching points is generated based on the feature point in the current image and the feature point in the previous image.

In detail, the feature point extracted from the current image and the corresponding feature point of the previous image may form the pair of matching points. Generally, when there are more pair of matching points, the accuracy of the transformation matrix obtained subsequently based on the pair of matching points may be high.

With the above method for detecting a subject, the feature point is extracted from the current image, and the corresponding feature point is extracted from the previous image, such that the pair of matching points is generated based on the feature point in the current image and the feature point in the previous image. The extracted feature points may accurately represent features of the current image and the previous image. Therefore, accuracy of the transformation matrix may be improved, and the accuracy of the subject detection may be increased.

In an example, generating the pair of tracking points based on the random points of each sub-region of the current image and the random points of each sub-region of the previous image may include the following. Optical flow tracking is performed on the random points of each sub-region of the current image and the random points of each sub-region of the previous image, to obtain a motion vector between the current image and the previous image. The random points of the previous image are mapped to the current image based on the motion vector, to generate the pair of tracking points.

The pair of tracking points refers to the pair of target points obtained by the optical flow tracking.

In the sequence of images of video, motion of the subject between frames may be represented as a motion speed of the subject. The motion speed is the optical flow. The motion vector refers to a displacement of the subject in the current image with respect to the previous image. By performing the optical flow tracking on the random points of each sub-region of the current image and the random points of each sub-region of the previous image, the motion vector between the current image and the previous image may be obtained by solving a motion equation of the object. The object may be a pixel point or a region including multiple pixel points, which is not limited thereto.

Based on the motion vector, the displacement of the object in the current image with respect to the previous image may be obtained. The random points of the previous image may be mapped to the current image through the motion vector to find the corresponding random point of the current image. The random point of the previous image and the corresponding random point of the current image may form the pair of tracking points.

With the above method of detecting a subject, the optical flow tracking is performed on the current image and the previous image, to obtain the motion vector between the current image and the previous image, and the random point of the previous image is mapped to the current image based on the motion vector, which may generate the accurate pair of tracking points.

In an example, the above method may also include the following. Vector filtering is performed on the random points of the current image and the random points of the previous image, to obtain a target random point of the current image and a target random pint of the previous image. Mapping the random point of the previous image to the current image based on the motion vector to generate the pair of tracking points may include: mapping the target random point of the previous image to the current image based on the motion vector to generate the pair of tracking points.

The vector filtering may include modulus filtering and angle filtering. Some erroneous random points may be removed through the vector filtering. Further, when the random point in one image is removed, the corresponding random point is removed from the other image.

With the above method for detecting a subject, the vector filtering is performed on the random points of the current image and the random pints of the previous image, which may remove the erroneous random points, thereby obtaining an accurate pair of tracking points.

In another example, the optical flow tracking may be performed on the current image and the previous image firstly, to obtain the pair of tracking points, and the vector filtering may be performed on the pair of tracking points to remove the erroneous pairs of tracking points, to obtain accurate pairs of tracking points.

Figure 6:
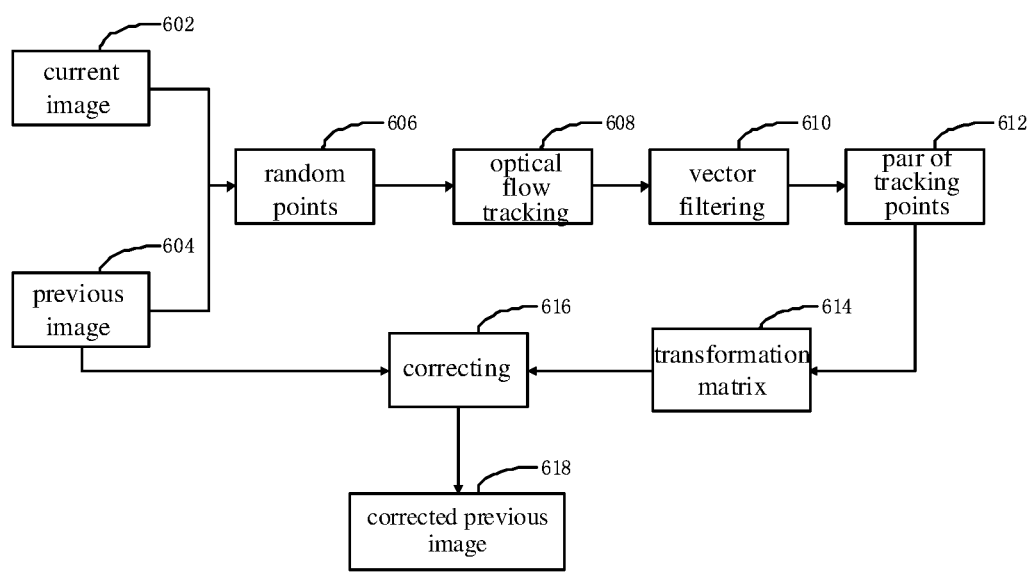
FIG. 6 is a schematic diagram illustrating correction of a previous image based on a pair of tracking points according to an embodiment.

In an example, as illustrated in FIG. 6, the same division is performed on the current image 602 and the previous image 604, to obtain the sub-regions of the current image and the sub-regions of the previous image. The target number of random points 606 are respectively extracted from each sub-region of the current image and each sub-region of the previous image. A block 608, i.e., an optical flow tracking, is performed on the random points of each sub-region of the current image and the random points of each sub-region of the previous image to obtain a motion vector between the current image and the previous image. The random points of the previous image are mapped to the current image through the motion vector to generate first pairs of tracking points. A block 610, i.e., a vector filtering is performed on the random points of the first pairs of tracking points to remove an erroneous random point, to obtain a target random point of the current image and a target random point of the previous image. The target random point of the current image and the target random point of the previous image form second pairs of tracking points, i.e., the pair of tracking points 612. A transformation matrix 614 between the current image and the previous image is obtained based on the pair of tracking points 612. A block 616, i.e., the correction is performed on the previous image 604 based on the transformation matrix 614 to obtain the corrected previous image 618.

In an example, generation of the pair of matching points based on the feature point extracted from the current image and the previous image may include the following. A feature descriptor is generated based on each feature point extracted from the current image. A feature descriptor is generated based on each feature point extracted from the previous image. The feature descriptor of the current image is matched with the feature descriptor of the previous image, to obtain the pair of matching points.

The feature descriptor is used to represent features of the feature point. For example, the feature descriptor may represent a pixel value of the feature point, a direction of the feature point, field information of the feature point and the like, which is not limited thereto. By obtaining the pixel value of the feature point, the direction of the feature point, the field information of the feature point, the feature descriptor of the feature point may be generated.

The feature descriptor may be that ORB (oriented Fast and rotated BRIEF) feature descriptor=Fast feature point (corner point) extraction+BRIEF feature description, a SIFT (scale-invariant feature transform) feature descriptor, or other feature descriptor, which is not limited thereto.

In detail, the feature descriptor of the current image may be matched with the feature descriptor of the previous image. For example, at least one of the pixel value of the feature point, the direction of the feature point, the field information of the feature point may be matched between the current image and the previous image. The more matched features, the more accurate the pair of matching points is.

With the above method for detecting a subject, the feature descriptor of the current image is matched with the feature descriptor of the previous image, to obtain an accurate pair of matching points.

In an example, the pair of matching points may be processed by a RANSAC (random sample consensus) algorithm, to remove some erroneous pairs of matching points, and to obtain the accurate pairs of matching points.

Figure 7:
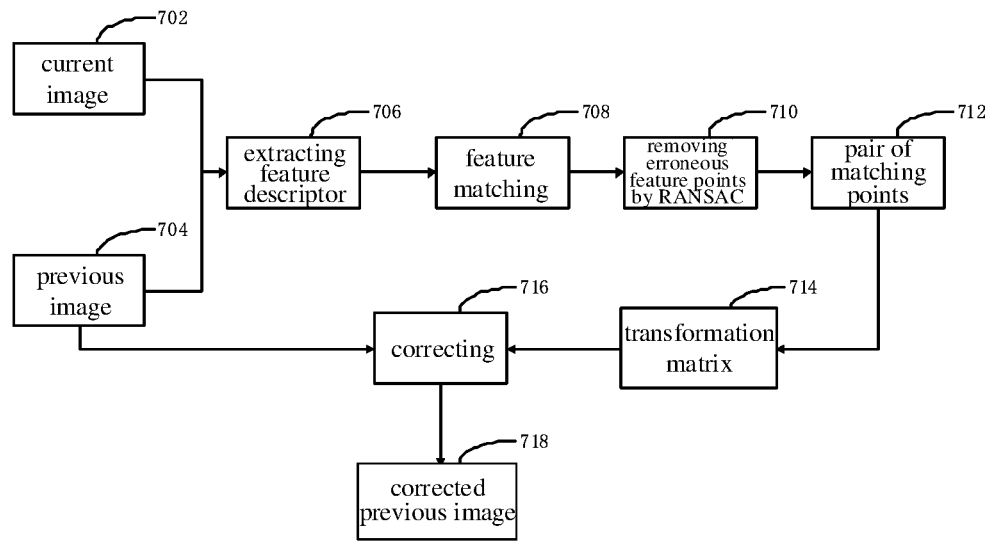
FIG. 7 is a schematic diagram illustrating correction of a previous image based on a pair of matching points according to an embodiment.

In some examples, as illustrated in FIG. 7, the feature point is extracted from the current image 702, and the corresponding feature point is extracted from the previous image 704. A block 706 is performed, i.e., the feature descriptor is generated based on each feature point extracted from the current image 702 and the feature descriptor is generated based on each feature point extracted from the previous image 704. A block 708 is performed, i.e., the feature descriptor of the current image is matched with the corresponding feature descriptor of the previous image, to obtain a first pair of matching points. In an example, a block 710 is performed, i.e., the first pair of matching points is processed by employing a RANSAC algorithm, to remove some erroneous first pairs of matching point that are matched erroneously to obtain accurate second pairs of matching points (i.e., the pairs of matching points 712). The transformation matrix 714 between the current image and the previous image is obtained based on the pairs of matching points 712. A block 716 is performed, i.e., the previous image 704 is corrected based on the transformation matrix 714 to obtain the corrected previous image 718.

Figure 8:
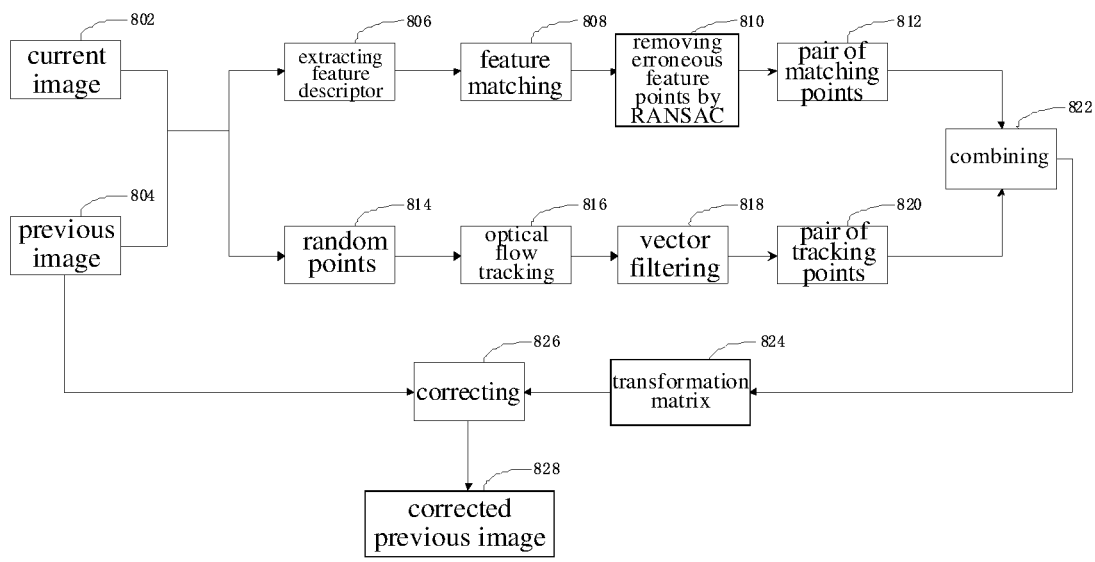
FIG. 8 is a schematic diagram illustrating correction of a previous image based on a pair of tracking points and a pair of matching points according to an embodiment.

In an example, the pair of target points may include both the pair of tracking points and the pair of matching points, as illustrated in FIG. 8. The feature point is extracted from the current image 802 and the corresponding feature point is extracted from the previous image 804. A block 806 is performed, i.e., the feature descriptor is generated based on each feature point extracted from the current image 802, and the feature descriptor is generated based on each feature point extracted from the previous image 804. A block 808 is performed, i.e., the feature matching is performed between the feature descriptor of the current image and the feature descriptor of the previous image to obtain the first pair of matching points. In an example, a block 810 is executed, i.e., the first pairs of matching points are processed by employing the RANSAC algorithm, to remove some first pairs of matching points that are matched erroneously, to obtain accurate second pairs of matching points (i.e., the pairs of matching points 812).

The same division is performed on the current image 802 and the previous image 804, to obtain the sub-regions of the current image and the sub-regions of the previous image. The target number of random points 814 are extracted respectively from each sub-region of the current image and each sub-region of the previous image. A block 816, i.e., an optical flow tracking, is performed on the random points in each sub-region of the current image and the random points in each sub-region of the previous image, to obtain a motion vector between the current image and the previous image. The random points of the previous image are mapped to the current image based on the motion vector, to generate the first pair of tracking points. A block 818, i.e., the vector filtering, is performed on the random points included in the first pair of tracking points, to remove erroneous random points, to obtain a target random point of the current image and a target random pint of the previous image. The target random point of the current image and the target random point of the previous image form a second pair of tracking points (i.e., the pair of tracking points 820).

At block 822, the pair of matching points 812 and the pair of tracking points 820 are combined. That is, the pair of matching points 812 and the pair of tracking points 820 are used as the pair of target points, and the transformation matrix 824 between the current image and the previous image is obtained based on the pair of target points. A block 826, i.e., the correction, is performed on the previous image 804 based on the transformation matrix 824 to obtain the corrected previous image 828.

Figure 9:
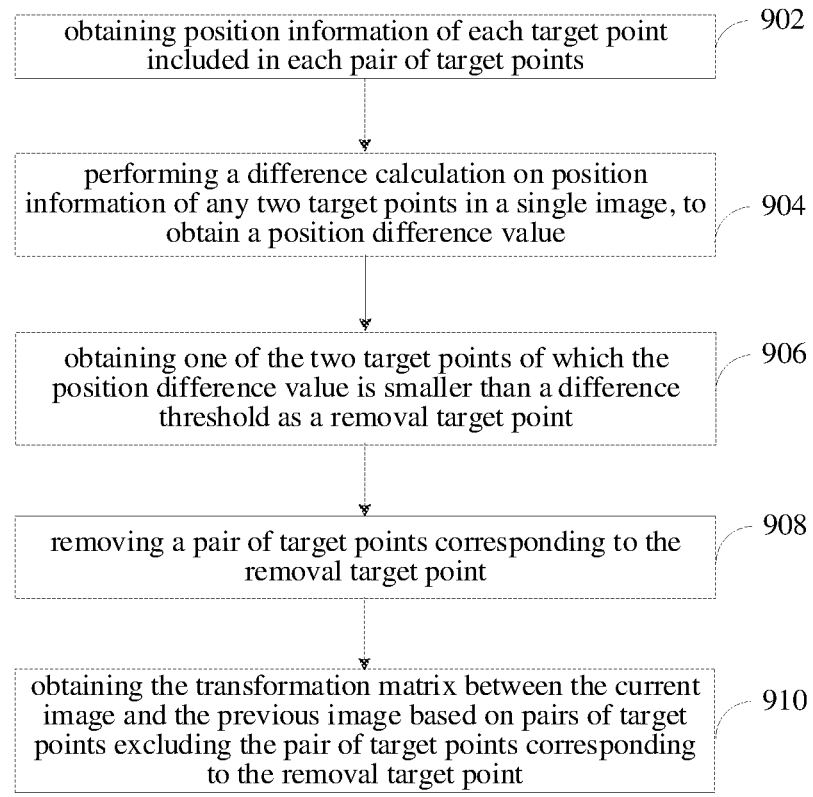
FIG. 9 is a flow chart illustrating removal of a pair of target points according to an embodiment.

In an example, as illustrated in FIG. 9, the above method may include following.

At block 902, position information of each target point included in each pair of target points obtained.

The position information of the target point may be represented as a coordinate. For example, the position information of the target point may be (50,100), representing that the target point is located at an intersection of the $50^{th}$ row and the $100^{th}$ column of an image. As another example, the position information of the target point may be (80,12), representing that the target point is located at an intersection of the $80^{th}$ row and the $12^{th}$ column of the image.

At block 904, a difference calculation is performed on the position information of any two target points of a single image, to obtain a position difference value.

In a single image, the position information of any two target points is obtained, and the difference calculation is performed on the obtained position information of the two target points to obtain the position difference value.

For example, in the current image, the position information of any two target points is (50,100) and (50,90). The position difference value may be calculated using a formula of $S=\sqrt{(a_1-a_2)^2+(b_1-b_2)^2}$, where S represents the position difference value, $a_1$ and $b_1$ are respectively the abscissa and ordinate of one target point, and $a_2$ and $b_2$ are respectively the abscissa and ordinate of the other target point. Therefore, the position difference value between the two target points is $S=\sqrt{(50-50)^2+(100-90)^2}=10$.

At block 906, a target point is obtained from the two target points of which the position difference value is smaller than a difference threshold as a removal target point.

The removal target point refers to a target point to be removed.

When the position difference value is smaller than the difference threshold, it may be determined that the positions of the obtained two target points are closed to each other, such that one of the two target points of which the position difference value is smaller than the difference threshold is obtained as the removal target point.

At block 908, a pair of target points corresponding to the removal target point is removed.

After the removal target point is obtained, the pair of target points corresponding to the removal target point is removed. For example, the pair of target points includes the target point A and the target point B. When it is determined that the target point A is the removal target point, the pair of target points corresponding to the target point A is removed. That is, both the target point A and the target point B are removed.

Obtaining the transformation matrix between the current image and the previous image based on the pair of target points may include the following.

At block 910, the transformation matrix between the current image and the previous image is obtained based on pairs of target points excluding the pair of target points corresponding to the removal target point.

It may be understood that, features of the target points in the same region are relatively closed to each other. A problem that multiple target points of the same region are processed such that resources of the electronic device are wasted and the accuracy of a global matrix is reduced may be solved by removing some target points when there are multiple target points in the same region. After the pair of target points corresponding to the removal target point is removed, a global distribution of the target points is good, and the remaining pairs of target points are processed such that the transformation matrix between the current image and the previous image may be obtained quickly and the efficiency of obtaining the transformation matrix is improved.

In an example, the above method may further include: in response to detecting that the current image does not indicate the shaking state, inputting the current image into the subject detection model and performing the subject detection on the current image based on the subject detection model, to obtain the target subject.

When it is detected that the current image does not indicates the shaking state (that is, the current image indicates the static state), the current image is directly input into the subject detection model, and the subject detection is performed on the current image based on the subject detection model to obtain the target subject quickly, thereby improving the accuracy of the subject detection.

Figure 10:
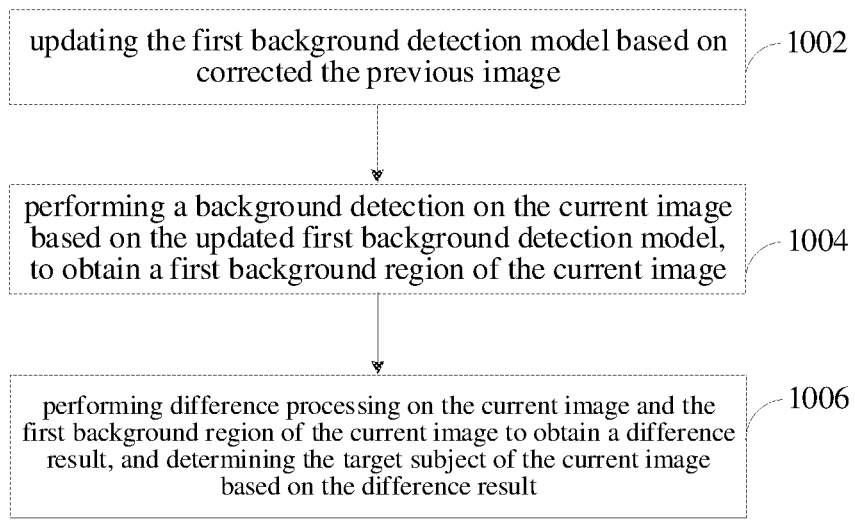
FIG. 10 is a flow chart illustrating obtaining of a target subject from a current image according to an embodiment.

In an example, as illustrated in FIG. 10, the subject detection model may include a first background detection model. Updating the subject detection model based on the corrected previous image corrected, and performing the subject detection on the current image based on the updated subject detection model to obtain the target subject may include the following.

At block 1002, the first background detection model is updated based on the corrected previous image.

The first background detection model refers to a model for detecting a background of an image. The first background detection model may be a single-Gaussian model. The first background detection model may include one or more parameters, such as a mean and a variance of pixel values in a background region, a mean and a variance of pixel values in a subject region, etc., which is not limited here.

Parameters of the first background detection model may be updated based on the corrected previous image.

At block 1004, a background detection is performed on the current image based on the updated first background detection model, to obtain a first background region of the current image.

The first background region refers to the background region obtained by performing the background detection on the current image through the first background detection model.

The corrected previous image is closer to the current image than the previous image. After the first background detection model is updated based on the previous image, the updated first background detection model may detect the background of the current image more accurately than the first background detection model, such that first background area of the current image may be detected more accurately.

At block 1006, the difference processing is performed on the current image and the first background region of the current image to obtain a difference result, and the target subject of the current image is determined based on the difference result.

The difference result refers to a result obtained after the difference processing. The difference result may include one or more subjects. It may be understood that, the current image includes the background region and the target subject. The difference processing is performed on the current image and the first background region of the current image, and the target subject of the current image may be obtained based on the difference result.

With the above method for detecting a subject, the first background detection model is updated based on the corrected previous image, such that the more accurate first background detection model may be obtained. The background detection is performed on the current image based on the updated first background detection model, such that the more accurate first background region of the current image may be obtained. Therefore, the more accurate target subject of the current image may be obtained, thereby improving accuracy of the subject detection.

In an example, the subject detection model may further include a second background detection model. The second background detection model may be a candidate background detection model.

The subject detection model includes a background detection model. The background detection model may include the first background detection model and the second background detection model. The second background detection model is also configured to perform the background detection on the image. The second background detection model may also be a single-Gaussian model. However, parameters of the second background detection model are different from those of the first background detection model. For example, the parameters may be a mean and a variance of pixel values in the background region, a mean and a variance of pixel values in the subject region and the like. A single background detection model is employed to perform the background detection on the current image every time, such that the currently employed background detection model may be used as the first background detection model, and the other on may be taken as the second background detection model.

Figure 11:
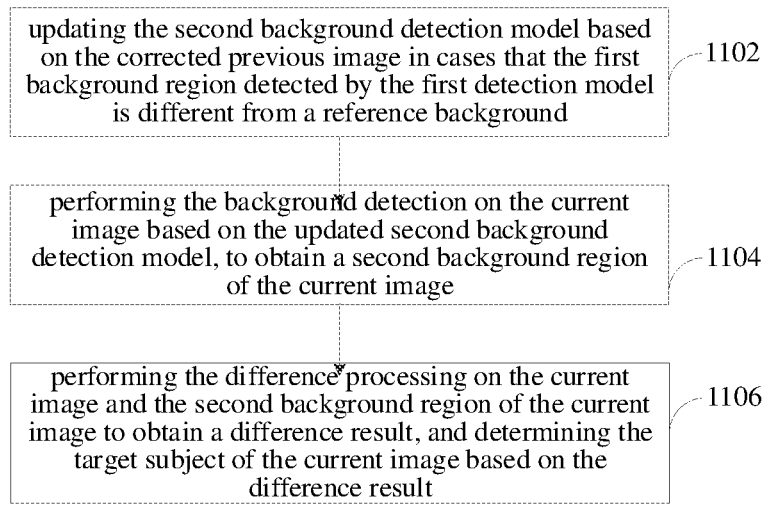
FIG. 11 is a flow chart illustrating obtaining of a target subject from a current image according to another embodiment.

As illustrated in FIG. 11, the method may also include the following.

At block 1102, the second background detection model is updated based on the corrected previous image under a case that the first background region detected by the first background detection model is different from a reference background.

The reference background is used to be compared with the detected background region. The reference background may be obtained by processing the current image through a Gaussian function, or by obtaining a preset region of the current image, which is not limited thereto. The second background region refers to a background region obtained by performing the background detection on the current image through the second background detection model.

In an example, determining whether the detected first background region is different from the reference background may include the following. The detected first background region is compared with the reference background to obtain a difference degree. The difference degree is used to represent a difference degree between the detected first background region and the reference background. When the difference degree is greater than a difference degree threshold, it may be determined that the detected first background region is different from the reference background. When the difference degree is smaller than or equal to the difference degree threshold, it may be determined that the detected first background region is same to the reference background.

In detail, the pixel value of each pixel point of the detected first background region may be obtained, and the pixel value of a corresponding pixel point of the reference background may be obtained. The pixel value of each pixel point included in the first background region is subtracted from the pixel value of the corresponding pixel point in the reference background to obtain a difference value, and an absolute value of the difference value is obtained. All absolute values are summed up to obtain a sum. The obtained sum may represent the difference degree between the detected first background region and the reference background, i.e., the difference degree.

When the difference degree is greater than the difference degree threshold, it may be determined that a relatively large difference exists between the first background region and the reference background and the first background region is different from the reference background. When the difference degree is smaller than or equal to the difference degree threshold, it may be determined that a relatively small difference exists between the first background region and the reference background and the detected first background region is same to the reference background.

At block 1104, the background detection is performed on the current image based on the updated second background detection model, to obtain a second background region of the current image.

When the first background region detected by the first background detection model is different from the reference background (i.e., the first background region detected by the first background detection model is inaccurate), the second background detection model is updated, and the background detection is performed on the current image through the updated second background detection model, to obtain the second background region of the current image.

At block 1106, the difference processing is performed on the current image and the second background region of the current image to obtain a difference result, and the target subject of the current image is determined based on the difference result.

The difference result refers to a result obtained after the difference processing. The difference result may be one or more subjects. After the background detection is performed on the current image through the updated second background detection model to obtain the second background region of the current image, the difference processing is performed on the current image and the second background region of the current image, and the target subject of the current image may be obtained based on the difference result.

In a conventional background detection method, a GMM (Gaussian mixture model) is generally employed for detection, which requires a large computation amount. However, when both the first background detection model and the second background detection model are the single-Gaussian models and only one model is configured to perform the background detection on the current image at any time, the calculation amount of the single-Gaussian model is less than that of the GMM. When the first background region detected by the first background detection model is different from the reference background, it may be indicated that the first background region detected by the first background detection model is inaccurate, the updated second background detection model is configured to perform the background detection on the current image, which may not only improve the accuracy of the detected background region and improve the accuracy of the subject detection, but also avoid the large calculation amount.

In an example, the above method may further include the following. An update coefficient of the first background detection model and an update coefficient of the second background detection model are obtained. The update coefficient represents an update degree of the background detection model. The update coefficient of the first background detection model is compared with the update coefficient of the second background detection model to obtain a greater update coefficient. The background detection model with the greater update coefficient is selected from the first background detection model and the second background detection model, to perform the background detection on the current image.

The update coefficient refers to an update degree of the background detection model. The larger the update coefficient, the greater the update degree of the background detection model is, and the more accurate the background region obtained by performing the background detection on the current image is.

Therefore, the update coefficient of the first background detection model and the update coefficient of the second background detection model may be obtained in real time. The update coefficient of the first background detection model is compared with the update coefficient of the second background detection model. The background detection model with the greater update coefficient is determined from the first background detection model and the second background detection model to perform the background detection on the current image.

In an example, the first background detection model performs the background detection on the current image. That is, the second background detection model is the candidate background detection model. When the update coefficient of the first background detection model is greater than or equal to the update coefficient of the second background detection model, the background detection is performed on the current image still through the first background detection model, and the second background detection model is still the candidate background detection model. When the update coefficient of the first background detection model is smaller than the update coefficient of the second background detection model, the background detection is performed on the current image through the second background detection model. That is, the first background detection model is the candidate background detection model.

In another example, the second background detection model performs the background detection on the current image. That is, the first background detection model is the candidate background detection model. When the update coefficient of the second background detection model is greater than or equal to the update coefficient of the first background detection model, the background detection is performed on the current image still through the second background detection model, and the first background detection model is still the candidate background detection model. When the update coefficient of the second background detection model is smaller than the update coefficient of the first background detection model, the background detection is performed on the current image through the first background detection model. That is, the second background detection model is the candidate background detection model.

With the above method for detecting a subject, the update coefficient of the first background detection model and the update coefficient of the second background detection model are obtained, the update coefficient of the first background detection model is compared with the coefficient of the second background detection model, and the background detection model with the greater update coefficient is determined from the first background detection model and the second background detection model to perform the background detection on the current image, thereby accurately detecting the background region of the current image.

In another example, the difference processing may be performed on the current image and the previous image, to detect the background region of the current image, thereby saving the calculation amount.

In another example, the background detection may also be performed on the current image through other background detection models, such as a ViBe (visual background extractor) model, to obtain the accurate background region.

In an example, candidate subjected may be obtained after the difference processing, and the morphological processing is performed on each candidate subject and the background region, to obtain the target subject.

In detail, the morphological processing may include dilation, erosion, and the like. The erosion operation may be performed on each candidate body, and then the dilation operation is performed, to obtain the accurate target subject.

In mathematics, the dilation or erosion operation is to convolve an image (or a part of the image, called as A) with a kernel (called as B). The kernel may be of any shape and size and has a reference point that is individually defined (called as anchorpoint). For example, the kernel may be a full-value kernel shaped of a small square with a reference point at the center and filled with non-zero values, or the kernel may also be a kernel shaped of a small disk with a reference point at the center and filled with non-zero values.

The dilation refers to convolving B with A to calculate a maximum value of pixel point in a region covered by B, and assigning the maximum value to the pixel designated by the reference point. A highlight region of the image may be gradually increased by the dilation.

The erosion refers to convolving B with A to calculate a minimum value of pixel point in the region covered by B, and assigning the minimum value to the pixel designated by the reference point. A dark region in the image may be gradually increased by the erosion.

By performing the morphological processing on the candidate subjects, noise may be reduced from the candidate subjects, and the number of voids in the candidate subjects may be reduced to obtain the accurate target subject.

In an example, determining the target subject of the current image based on the difference result may include the following. The candidate subjects included in the difference result are obtained. It is determined whether a moving subject is included in the candidate subjects. A motion region including the moving subject is inputted into a subject segmentation network to obtain the target subject of the current image, when the moving subject is included in the candidate subjects. The current image is inputted into the subject segmentation network to obtain the target subject of the current image when no moving subject is included in the candidate subjects.

The difference processing is performed on the current image and the background region of the current image to obtain the difference result. One or more candidate subjects may be included in the difference result. The motion region may be a rectangular region including the moving subject, a circular region including the moving subject, or an irregularly shaped region including the moving subject, which is not limited thereto. The subject segmentation network refers to a network for dividing the inputted image region to obtain the subject.

In an example, it may be determined whether the moving body is included in the candidate subjects based on an area of each candidate subject. For example, when the area of the candidate subject is greater than an area threshold, the candidate subject may be taken as the moving body.

In another example, it may be determined whether the moving subject is included in the candidate subjects based on definition of a contour edge of each candidate subject. It may be understood that, when the moving subject is included in the image, the contour edge of the moving subject of the image is blurred to some certain extent. Therefore, the definition of the contour edge of each candidate subject may be obtained. When the definition of the contour edge is greater than a definition threshold, it may be determined that the candidate subject is a static object. When the definition of the contour edge is smaller than or equal to the definition threshold, it may be determined that the candidate body is the moving subject.

In other examples, feature points may be extracted from each candidate subject, to generate the feature descriptor of each feature point, and it is determined whether the moving subject is included in the candidate subjects based on the feature descriptor.

The method for determining whether the moving subject is included in the candidate subjects may include, but be not limited to, the above in the present disclosure.

When the moving subject is included in the candidate subjects, the motion region including the moving subject is obtained. The motion region is input into the subject segmentation network to obtain the target subject of the current image. When no moving subject is not included in the candidate subjects, the current image is input into the subject segmentation network to obtain the target subject.

With the above method for detecting a subject, the candidate subjects included in the difference result are obtained. It is determined whether the moving subject is included in the candidate subjects. The current image may be directly input into the subject segmentation network to obtain the target subject of the current image, when no moving subject is included in the candidate subjects. The motion region including the moving subject may be input into the subject segmentation network to obtain the target subject of the current image under the case that the moving subject is included in the candidate subjects, to obtain the target subject of the current image, thereby avoiding to process all candidate subjects and saving the calculation amount of the electronic device.

In an example, determining whether the moving subject is included in the candidate subjects may include the following. The area of each candidate body is obtained. It is determined that no moving subject is included in the candidate subjects under the case that the area of each candidate subject is smaller than the area threshold. It is determined that the moving subject is included in the candidate subjects under the case that the area of one candidate subject is greater than or equal to the area threshold. The moving subject is a candidate subject of which the area is greater than or equal to a region threshold.

It may be understood that, the area of the candidate subject is large, it is indicted that the candidate subject is closed to the camera and the subject closed to the camera is the subject that the user wants to photograph. Therefore, when the area of each candidate subject is smaller than the area threshold (i.e., the area of each candidate subject in the current image is small), it may be determined that none of the candidate subjects is neither the moving subject nor the subject that the user wants to photograph. Therefore, the current image is input into the subject segmentation network to obtain the target subject.

When the area of a candidate subject is greater than or equal to the area threshold, the candidate subject of which the area is greater than or equal to the area threshold may be the moving subject and the subject that the user wants to photograph. Therefore, the motion region including the moving subject is input into the subject segmentation network to obtain the target subject. It should be noted that, the target subject may be same to the candidate subject. That is, the target subject obtained after inputting the motion region into the subject segmentation network is still the moving body before the inputting. The target subject may be different from the moving subject.

In an example, the number of moving subjects is counted. When the number is at least two, the motion region where the moving subject having the maximum area is located may be obtained, and the motion region is input into the subject segmentation network to obtain the target subject.

Generally, when multiple moving subjects are included in an image, the subject having the maximum area may be subject photographed by the user. Therefore, when at least two moving subjects are included, in order to save the calculation amount of the electronic device, the motion region where the moving subject having the maximum area is located may be input into the subject segmentation network to obtain the target subject.

When one moving subject is included, the motion region where the moving subject is located may be input into the subject segmentation network to obtain the target subject.

With the above method for detecting a subject, the area of each candidate subject is obtained. It is determined that no moving subject is included in the candidate subjects under the case that the area of each candidate subject is smaller than the area threshold. It may be determined that the moving subject is included in the candidate subjects under the case that the area of a candidate subject is greater than or equal to the area threshold. Based on the area of each candidate subject, it may be determined accurately whether there is the moving subject in the candidate subjects.

Figure 12:
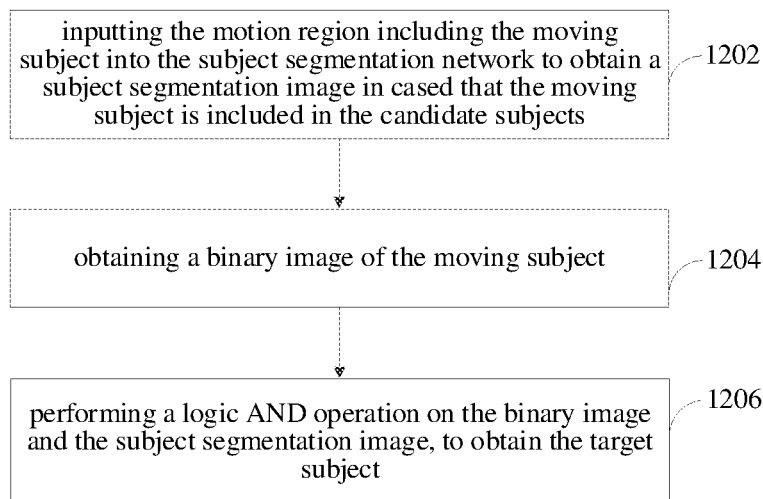
FIG. 12 is a flow chart illustrating obtaining of a target subject from a current image according to another embodiment.

In an example, as illustrated in FIG. 12, inputting the motion region including the moving subject into the subject segmentation network to obtain the target subject of the current image under the case that the moving subject is included in the candidate subjects may include the following.

At block 1202, the motion region including the moving subject is input into the subject segmentation network to obtain a subject segmentation image under the case that the moving subject is included in the candidate subjects.

The subject segmentation image refers to a subject image obtained by segmenting the motion region. The subject segmentation image may be same to or different from the candidate subject before inputting the motion region into the subject segmentation network.

At block 1204, a binary image of the moving subject is obtained.

The binary image refers to that the pixel value of each pixel point included in the image is represented by one of two values. For example, the two values may be 0 and 255. In this case, the pixel value of each pixel point included in the moving subject may be set to 0, while the pixel value of each pixel point included in other regions of the current image may be set to 255. The two values may also be 0 and 1. The two values may also be set to other values, which are not limited thereto.

Through the binary image of the moving subject, the region of the moving object and the region other than the moving subject may be accurately obtained.

At block 1206, a logic AND operation is performed on the binary image and the subject segmentation image to obtain the target subject.

The logic AND operation refers to a logic operator. For example, the logic AND operation is performed on 0 and 1 to obtain 0, on 1 and 0 to obtain 0, and on 1 and 1 to obtain 1. Performing the logic AND operation on the binary image and the subject segmentation image may refer to performing the logic AND operation on the value of the pixel point in the binary image and the value of the corresponding pixel point in the subject segmentation image.

The region of the moving subject may be obtained from the binary image, and another subject segmentation image including the moving subject may be obtained through the subject segmentation network. Performing the logic AND operation on the binary image and the subject segmentation image to obtain the accurate target subject.

In an example, the above method may further include the following. The target subject is focused on to obtain a next image. The previous image is replaced with the current image, and the current image is replaced with the next image. The transformation matrix between the current image and the previous image is determined in response to detecting that the current image indicates the shaking state. The previous image is corrected based on the transformation matrix to obtain the corrected previous image. The subject detection model is updated based on the corrected previous image to obtain the updated subject detection model. The subject detection is performed on the current image based on the updated subject detection model, to obtain the target subject. A target video is generated based on each corrected image.

Focusing on the target subject refers to a procedure of clearly imaging the photographed subject by changing an object distance and an image distance through a focusing mechanism of a camera.

After the subject detection is performed on the current image to obtain the target subject, the target subject is the subject photographed by the camera. Therefore, by focusing on the position of the target subject in the actual scenario, the camera may capture a next clear image of the target subject.

The previous image is replaced with the current image, and the current image is replaced with the next image. The transformation matrix between the current image and the previous image is obtained in response to detecting that the current image indicates the shaking state. The previous image is corrected based on the transformation matrix to obtain the corrected previous image. The subject detection model is updated based on the corrected previous image to obtain the updated subject detection model, and the subject detection is performed on the current image based on the updated subject detection model, to obtain the target subject. That is, the procedure for the subject detection is repeated, to obtain the image having the clearer target subject.

The previous image is corrected by using the current image, and the target video having the clear target subject may be obtained based on the corrected images.

In another example, after the target subject is obtained, target tracking may be performed on the target subject, to save the calculation amount of the electronic device. Further, after performing the target tracking on the target subject for a preset number of images, the current image is obtained, and the subject detection is performed on the current image, to obtain the target subject again.

Figure 13:
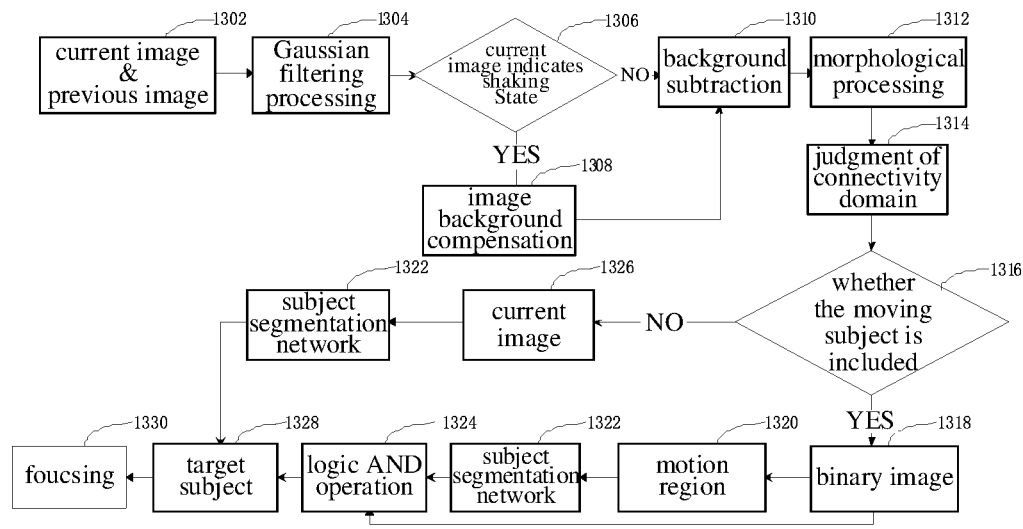
FIG. 13 is a schematic diagram illustrating detection of a subject according to an embodiment.

In an example, as illustrated in FIG. 13, the current image and the pervious image are obtained at block 1302. The Gaussian filtering may be performed on the current image and the previous image, to remove high-frequency noise, from the image, caused by a complex background with a large amount of texture details and high-frequency noise caused by image down-sampling processing, to prevent false detection of the subsequent subject detection.

A block 1306 is performed. That is, the current image subjected to the Gaussian filtering is detected, and it is determined whether the current image indicates the shaking state. At block 1308, when the current image indicates the shaking state, an image background compensation is performed on the current image. The image background compensation may be performed by the following. The pair of target points is obtained from the current image and the previous image, the transformation matrix between the current image and the previous image is obtained based on the pair of target points, and the previous image is corrected based on the transformation matrix to obtain the corrected previous image. The pair of target points may include at least one of a pair of tracking points and a pair of matching points.

A block 1310 is performed based on the corrected previous image. That is, background subtraction is performed on the current image to obtain a background region of the current image. The background subtraction may be performed by the following. The background detection model is updated based on the corrected previous image, and the background detection is performed on the current image based on the updated background detection model to obtain the background region of the current image. Further, the difference processing is performed on the background region and the current image, to obtain candidate subjects of the current image. The background detection model may include a first background detection model and a second background detection model. When the background detection is performed on the current image through the first background detection model, the second background detection model is a candidate background detection model. When the background detection is performed on the current image through the second background detection model, the first background detection model is the candidate background detection model. Both the first background detection model and the second background detection model may be the single-Gaussian model, which not only ensures the accuracy of the subject detection, but also avoids the large calculation amount.

In another example, the binary image of the current image may be generated based on the obtained background region and the candidate subjects.

The background region may be mapped to the current image, and a block 1312, i.e. the morphological processing, may be performed on the current image of which background region is detected. The morphological processing refers to performing an erosion operation on the current image of which the background region is detected, and performing an dilation operation on the image subjected to the erosion operation, which may remove the noise from the image and reduce the number of voids of the image.

A block 1314 is performed. That is, judgment of connectivity domain is performed on the current image subjected to the morphological processing. The connectivity domain refers to an enclosed and internally connected region. Through the judgment of the connectivity domain, some voids contained in the candidate subjects may be removed, to obtain the accurate candidate subject.

The area of each candidate subject is obtained, and a block 1316 is performed (i.e., it is determine whether the moving subject is included in the candidate subjects). When the area of an candidate subject is greater than or equal to the area threshold, the branch is YES. It may be determined that the moving subject is included in the candidate subjects and a block 1318 is performed (i.e., the binary image of the moving subject is obtained).

The binary image includes the moving body and the background region. The motion region 1320 including the moving subject may be obtained through the binary image.

The motion region is input into the subject segmentation network 1322 to obtain a subject segmentation image.

A block 1324 is performed. That is, a logic AND operation is performed on the binary image 1318 and the subject segmentation image, to obtain the target subject 1328.

When the area of each candidate subject is smaller than the area threshold, the branch is No. Tt may be determined that no moving subject is included in the candidate subjects, and the current image 1326 is input into the subject segmentation network 1322 to obtain the target subject 1328.

A block 1330 is performed. That is, the target subject is focused on to obtain the next image including the clear target subject. The previous image is replaced with the current image, and the current image is replaced with the next image. The transformation matrix between the current image and the previous image is obtained in response to detecting that the current image indicates the shaking state. The previous image is corrected based on the transformation matrix to obtain the corrected previous image. The subject detection model is updated based on the corrected previous image to obtain the updated subject detection model and the subject detection is performed on the current image based on the updated subject detection model, to obtain the target subject. The target video including the accurate target subject may be generated based on each corrected image.

It should be understood that, although blocks in the flow charts of FIG. 2, FIG. 4, FIG. 5, and FIG. 9 to FIG. 12 are sequentially displayed as indicated by arrows, these blocks are not necessarily sequentially performed in a sequence indicated by the arrows. Unless explicitly stated herein, executions of these blocks are not strictly limited in sequence, and these blocks may be executed in other sequences. And, at least some of blocks in FIG. 2, FIG. 4, FIG. 5, and FIG. 9 to FIG. 12 may include multiple sub-blocks or multiple stages. These sub-blocks or stages are not necessarily implemented simultaneously, but may be executed at different times, and the sequence of execution for these sub-blocks or stages is not necessarily sequential, but may be executed in turn or alternately with at least some of other blocks, the sub-blocks of other blocks, or stages of other blocks.

Figure 14:
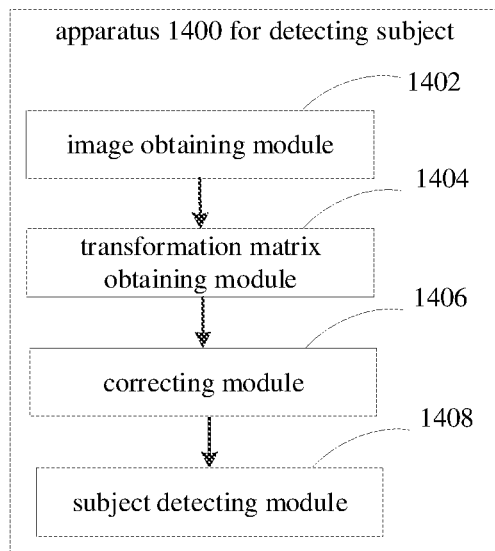
FIG. 14 is a block diagram illustrating an apparatus for detecting a subject according to an embodiment.

FIG. 14 is a block diagram illustrating an apparatus for detecting a subject according to an embodiment. As illustrated in FIG. 14, the apparatus 1400 for detecting a subject is provided. The apparatus 1400 may include an image obtaining module 1402, a transformation matrix obtaining module 1404, a correcting module 1406, and a subject detecting module 1408.

The image obtaining module 1402 is configured to obtain a current image and a previous image adjacent to the current image.

The transformation matrix obtaining module 1404 is configured to obtain a transformation matrix between the current image and the previous image in response to detecting that the current image indicates the shaking state.

The correcting module 1406 is configured to correct the previous image based on the transformation matrix to obtain a corrected previous image.

The subject detecting module 1408 is configured to update a subject detection model based on the corrected previous image to obtain an updated subject detection model, and to perform the subject detection on the current image based on the updated subject detection model, to obtain a target subject.

With the apparatus for detecting a subject, the current image and the previous image are obtained, the transformation matrix between the current image and the previous image is obtained in response to detecting that the current image indicates the shaking state, the previous image is corrected based on the transformation matrix to obtain the corrected previous image, in which the corrected previous image is closer to the current image, and the subject detection model is updated based on the corrected previous image to obtain the updated subject detection model, and the updated subject detection model may perform the subject detection on the current image accurately, to obtain the accurate target subject, thereby improving the accuracy of the subject detection.

In an example, the apparatus 1400 may include an image shaking detecting module. The image shaking detecting module is configured to compare the current image with the previous image, to obtain a scenario variation value corresponding to the current image. The scenario variation value represents a variation degree in the scenario between the current image and the previous image. In addition, the image shaking detecting module is further configured to determine that the current image indicates the shaking state under a case that the scenario variation value is greater than a threshold.

In an example, the image shaking detecting module is further configured to perform difference processing on the current image and the previous image and perform binarization processing to obtain a binary difference image, to calculate a sum of values of each pixel point in the binary difference image, and to determine that the current image indicates the shaking state under a case that the sum is greater than a sum threshold.

In an example, the image shaking detecting module is further configured to obtain a pixel value of each pixel point included in the current image, and to obtain a pixel value of each pixel point included in the previous image, to generate a first vector of pixel values for the current image based on the pixel value of each pixel point included in the current image, to generate a second vector of pixel values for the previous image based on the pixel value of each pixel point included in the previous image, to determine a vector distance between the current image and the previous image based on the first vector of pixel values and the second vector of pixel values, and to determine that the current image indicates the shaking state under a case that the vector distance is greater than a distance threshold. The first vector of pixel values represents a distribution of each pixel value of the current image and the second vector of pixel values represents a distribution of each pixel value of the previous image.

In an example, the transformation matrix obtaining module 1404 is also configured to obtain a pair of target points from the current image and the previous image under the case that the current image indicates the shaking state and to obtain the transformation matrix between the current image and the previous image based on the pair of target points.

In an example, the transformation matrix obtaining module 1404 is also configured to obtain at least one of a pair of tracking points and a pair of matching points. Generation of the pair of tracking points may include: performing a same division on the current image and the previous image, to obtain sub-regions of the current image and sub-regions of the previous image, extracting a target number of random points from each sub-region of the current image and each sub-region of the previous image respectively; and generating the pair of tracking points based on the random points of each sub-region of the current image and the random points of each sub-region of the previous image. Generation of the pair of matching points may include: extracting a feature point from the current image, extracting a corresponding feature point from the previous image, and generating the pair of matching points based on the feature point extracted from the current image and the feature point extracted from the previous image.

In an example, the transformation matrix obtaining module 1404 is also configured to perform an optical flow tracking on the random points of each sub-region of the current image and the random points of each sub-region of the previous image, to obtain a motion vector between the current image and the previous image, and map the random points of the previous image to the current image based on the motion vector, to generate the pair of tracking points.

In an example, the apparatus 1400 may further include a vector filtering module. The vector filtering module may be configured to perform vector filtering on the random points of the current image and the random points of the previous image, to obtain a target random point of the current image and a target random pint of the previous image. Mapping the random points of the previous image to the current image based on the motion vector to generate the pair of tracking points may include: mapping the target random point of the previous image to the current image based on the motion vector to generate the pair of tracking points.

In an example, the transformation matrix obtaining module 1404 may be further configured to generate a feature descriptor based on each feature point of the current image and a feature descriptor based on each feature point extracted from the previous image, and to match the feature descriptor of the current image with the feature descriptor of the previous image, to obtain the pair of matching points.

In an example, the apparatus 1400 may further include a target point removing module. The target point removing module may be configured to obtain position information of each target point included in each pair of target points, to perform a difference calculation on position information of any two target points in a single image to obtain a position difference value, to obtain one target point from the two target points of which the position difference value is smaller than a difference threshold as a removal target point, and to remove the pair of target points corresponding to the removal target point. Obtaining the transformation matrix between the current image and the previous image based on the pair of target points may include: obtaining the transformation matrix between the current image and the previous image based on pairs of target points excluding the pair of target points corresponding to the removal target point.

In an example, the subject detecting module 1408 may be further configured to, in response to detecting that the current image does not indicate the shaking state, input the current image into the subject detection model, and perform the subject detection on the current image based on the subject detection model, to obtain the target subject.

In an example, the subject detection model may include a first background detection model. The subject detection module 1408 is further configured to update the first background detection model based on the corrected previous image to obtain an updated first background detection model, to perform the background detection on the current image based on the updated first background detection model to obtain a first background region of the current image, to perform a difference processing on the current image and the first background region of the current image to obtain a difference result, and to determine the target subject of the current image based on the difference result.

In an example, the subject detection model may further include a second background detection model. The second background detection model is a candidate background detection model. The subject detection module 1408 may be further configured to update the second background detection model based on the corrected previous image to obtain an updated second background detection model under a case that the first background region detected by the first detection model is different from a reference background, to perform the background detection on the current image based on the updated second background detection model to obtain a second background region of the current image, to perform the difference processing on the current image and the second background region of the current image to obtain a difference result, and to determine the target subject of the current image based on the difference result.

In an example, the apparatus 1400 may further include a model switching module. The model switching module may be configured to obtain an update coefficient of the first background detection model and an update coefficient of the second background detection model. The update coefficient represents an update degree of the background detection model. The model switching module may be further configured to compare the update coefficient of the first background detection model with the update coefficient of the second background detection model and determine the background detection model having the larger update coefficient from the first background detection model and the second background detection model to perform the background detection on the current image.

In an example, the subject detecting module 1408 may be further configured to obtain the candidate subjects included in the difference result, to determine whether the moving subject is included in the candidate subjects, to input a motion region including the moving subject into a subject segmentation network to obtain the target subject of the current image under a case that the moving subject is included in the candidate subjects; and to input the current image into the subject segmentation network to obtain the target subject of the current image under a case that no moving subject is included in the candidate subjects.

In an example, the subject detecting module 1408 is further configured to obtain an area of each candidate subject, to determine that the moving subject is not included in the candidate subjects under a case that the area of each candidate subject is smaller than an area threshold, and to determine that the moving subject is included in the candidate subjects under a case that the area of a candidate subject is greater than or equal to the area threshold. The moving subject is a candidate subject of which the area is greater than or equal to a region threshold.

In an example, the subject detecting module 1408 may be further configured to input the motion region including the moving subject into the subject segmentation network to obtain a subject segmentation image under the case that the moving subject is included in the candidate subjects, to obtain a binary image of the moving subject, and perform a logic AND operation on the binary image and the subject segmentation image, to obtain the target subject.

In an example, the apparatus 1400 may further include a target video generating module. The target video generating module may be configured to focus on the target subject to obtain a next image, to replace the previous image with the current image, to replace the current image with the next image, to obtain the transformation matrix between the current image and the previous image in response to detecting that the current image indicates the shaking state, to correct the previous image based on the transformation matrix to obtain the corrected previous image, to update the subject detection model based on the corrected previous image to obtain the updated subject detection model, to perform the subject detection on the current image based on the updated subject detection model, to obtain a target subject, and to generate a target video based on each corrected image.

The division of each module in the apparatus for detecting a subject is merely for illustration. In other embodiments, the apparatus for detecting a subject may be divided into different modules as required to complete all or part of the functions of the apparatus for detecting a subject.

Figure 15:
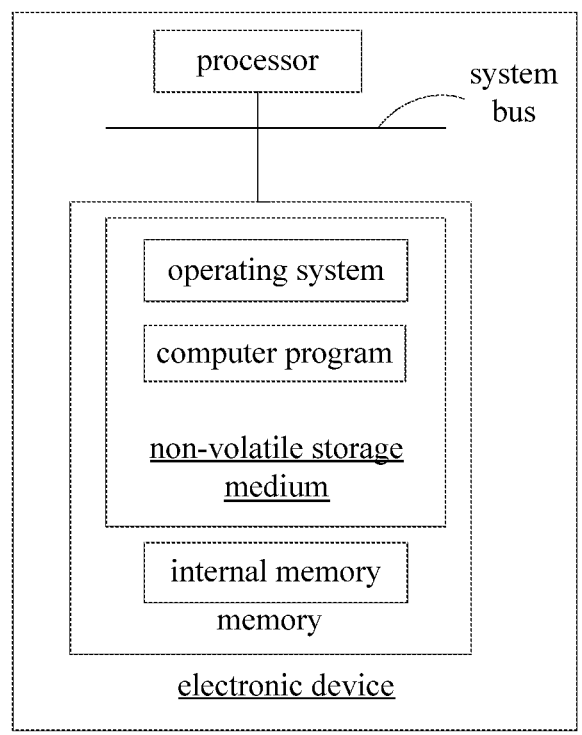
FIG. 15 is a block diagram illustrating internal structure of an electronic device according to an embodiment.

FIG. 15 is a block diagram illustrating an internal structure of an electronic device according to an embodiment. As illustrated in FIG. 15, the electronic device may include a processor and a memory coupled to a system bus. The processor is configured to provide computing and control capabilities to support the operation of the entire electronic device. The memory may include a non-volatile storage medium and an internal memory. The non-volatile storage medium stores an operating system and a computer program. The computer program may be executed by the processor for implementing method for detecting a subject according to the present disclosure. The internal memory provides a cached operating environment for the operating system and the computer program in non-volatile storage medium. The electronic device may be a mobile phone, a tablet computer, a personal digital assistant or a wearable device, etc.

Each module in the apparatus for detecting a subject according to any of embodiments of the present disclosure may be implemented in the form of the computer program. The computer program may be operated on a terminal or a server. The program module formed by the computer program may be stored on the memory of the terminal or the server. When the computer program is executed by the processor, the blocks of the method described in the embodiments of the present disclosure are implemented.

Embodiments of the present disclosure also provide a computer readable storage medium, and one or more non-volatile computer readable storage mediums including computer executable instructions. The method for detecting a subject may be implemented when the computer executable instructions are executed by one or more processors.

A computer program product includes instructions. When the instructions operate on a computer, the computer is caused to perform a method for detecting a subject.

Any reference to a memory, a storage medium, a database or other medium as used by the present disclosure may include non-volatile and/or volatile memory. A suitable non-volatile memory can include a ROM (read only memory), a programmable read-only memory (PROM), an erasable programmable read-only memory (EPROM), an electrically erasable programmable read-only memory (EEPROM), or a flash memory. The volatile memory can include a random access memory (RAM) which may act as an external cache memory. By way of illustration and not limitation, the RAM is available in many forms such as a static RAM (SRAM), a dynamic RAM (DRAM), a synchronous DRAM (S DRAM), a dual data rate SDRAM (DDRSDRAM), an enhanced SDRAM (ESDRAM), a synchlink DRAM (SLDRAM), a direct rambus RAM (DRRAM), a direct rambus dynamic RAM (DRDRAM) and a rambus dynamic RAM (RDRAM).

The above embodiments only express several implementations of the present application, and their description is relatively specific and detailed, but it cannot be interpreted as the limitation to the scope of the present application. It should be pointed out that for ordinary technical personnel in this field, certain deformation and improvement can be made under the premise of not deviating from the concept of the present application, which all belong to the protection scope of the present application. Therefore, the protection scope of the present application shall be subject to the attached claims.

What is claimed is:

1. A method for detecting a subject, comprising:
obtaining a current image and a previous image adjacent to the current image;
obtaining a transformation matrix between the current image and the previous image in response to determining that the current image indicates a shaking state;
correcting the previous image based on the transformation matrix to obtain a corrected previous image; and
updating a subject detection model based on the corrected previous image to obtain an updated subject detection model, and performing subject detection on the current image based on the updated subject detection model to obtain a target subject,
wherein determining that the current image indicates the shaking state comprises:
performing difference processing on the current image and the previous image and performing binarization processing to obtain a binary difference image; calculation a sum of values of each pixel point in the binary difference image; and determining that the current image indicates the shaking state in cases that the sum is greater than a sum threshold; or
obtaining a pixel value of each pixel point comprised in the current image, and obtaining a pixel value of each pixel point comprised in the previous image; generating a first vector of pixel values for the current image based on the pixel value of each pixel point comprised in the current image, the first vector of pixel values representing a distribution of each pixel value of the current image; generating a second vector of pixel values for the previous image based on the pixel value of each pixel point comprised in the previous image, the second vector of pixel values representing a distribution of each pixel value of the previous image; determining a vector distance between the current image and the previous image based on the first vector of pixel values and the second vector of pixel values; and determining that the current image indicates the shaking state in cases that the vector distance is greater than a distance threshold.

2. The method of claim 1, wherein obtaining the transformation matrix between the current image and the previous image in response to determining that the current image indicates the shaking state comprises:
obtaining a pair of target points from the current image and the previous image in cases that the current image indicates the shaking state; and
obtaining the transformation matrix between the current image and the previous image based on the pair of target points.

3. The method of claim 2, wherein the pair of target points comprises at least one of a pair of tracking points or a pair of matching points; and
the method further comprises:
generating the pair of tracking points by:
performing a same division on the current image and the previous image, to obtain sub-regions of the current image and sub-regions of the previous image;
extracting a target number of random points from each sub-region of the current image and each sub-region of the previous image respectively; and
generating the pair of tracking points based on the random points of each sub-region of the current image and the random points of each sub-region of the previous image; and
generating the pair of matching points by:
extracting a feature point from the current image and extracting a corresponding feature point from the previous image; and
generating the pair of matching points based on the feature point of the current image and the corresponding feature point of the previous image.

4. The method of claim 3, wherein generating the pair of tracking points based on the random points of each sub-region of the current image and the random points of each sub-region of the previous image comprises:
performing optical flow tracking on the random points of each sub-region of the current image and the random points of each sub-region of the previous image, to obtain a motion vector between the current image and the previous image; and
mapping the random points of the previous image to the current image based on the motion vector, to generate the pair of tracking points.

5. The method of claim 4, wherein the method further comprises:
performing vector filtering on the random points of the current image and the random points of the previous image, to obtain a target random point of the current image and a target random pint of the previous image; and
wherein mapping the random points of the previous image to the current image based on the motion vector to generate the pair of tracking points comprises:
mapping the target random point of the previous image to the current image based on the motion vector to generate the pair of tracking points.

6. The method of claim 3, wherein generating the pair of matching points based on the feature point of the current image and the corresponding feature point of the previous image comprises:
generating a feature descriptor based on each feature point extracted from the current image and a feature descriptor based on each feature point extracted from the previous image; and
matching the feature descriptor of the current image with the feature descriptor of the previous image, to obtain the pair of matching points.

7. The method of claim 2, wherein the method further comprises:
obtaining position information of each target point comprised in each pair of target points;
performing a difference calculation on position information of any two target points in a single image, to obtain a position difference value;
obtaining one of the two target points of which the position difference value is smaller than a difference threshold as a removal target point; and
removing a pair of target points corresponding to the removal target point; and
wherein obtaining the transformation matrix between the current image and the previous image based on the pair of target points comprises:
obtaining the transformation matrix between the current image and the previous image based on pairs of target points excluding the pair of target points corresponding to the removal target point.

8. The method of claim 1, wherein the subject detection model comprises a first background detection model; and
wherein updating the subject detection model based on the corrected previous image to obtain the updated subject detection model, and performing the subject detection on the current image based on the updated subject detection model, to obtain the target subject comprises:
updating the first background detection model based on the corrected previous image to obtain an updated first background detection model;
performing a background detection on the current image based on the updated first background detection model updated, to obtain a first background region of the current image; and
performing difference processing on the current image and the first background region of the current image to obtain a difference result, and determining the target subject of the current image based on the difference result.

9. The method of claim 8, wherein the subject detection model further comprises a second background detection model; the second background detection model is a candidate background detection model; and the method further comprises:
updating the second background detection model based on the corrected previous image to obtain an updated second background detection model in cases that that the first background region detected by the first detection model is different from a reference background;
performing the background detection on the current image based on the updated second background detection model, to obtain a second background region of the current image; and
performing the difference processing on the current image and the second background region of the current image to obtain a difference result, and determining the target subject of the current image based on the difference result.

10. The method of claim 9, wherein the method further comprises:
obtaining an update coefficient of the first background detection model and an update coefficient of the second background detection model, the update coefficients representing an update degree of the subject detection models; and
comparing the update coefficient of the first background detection model with the coefficient of the second background detection model, and determining a background detection model having a larger update coefficient from the first background detection model and the second background detection model to perform the background detection on the current image.

11. The method of claim 8, wherein determining the target subject of the current image based on the difference result comprises:
obtaining candidate subjects comprised in the difference result, and determining whether the candidate subjects comprises a moving subject;
inputting a motion region comprising the moving subject into a subject segmentation network to obtain the target subject of the current image in cases that the moving subject is comprised in the candidate subjects; and
inputting the current image into the subject segmentation network to obtain the target subject of the current image in cases that no moving subject is comprised in the candidate subjects.

12. The method of claim 11, wherein determining whether the candidate subjects comprises the moving subject comprises:
obtaining an area of each candidate subject;
determining that no moving subject is comprised in the candidate subjects in cases that the area of each candidate body is smaller than an area threshold; and
determining that the moving subject is comprised in the candidate subjects in cases that the area of a candidate body is greater than or equal to the area threshold, the moving subject is a candidate subject of which the area is greater than or equal to a region threshold.

13. An electronic device, comprising:
a processor; and
a memory, configured to a computer program;
wherein the processor is configured to:
obtain a current image and a previous image adjacent to the current image;
obtain a transformation matrix between the current image and the previous image in response to determining that the current image indicates a shaking state;
correct the previous image based on the transformation matrix to obtain a corrected previous image; and
update a subject detection model based on the corrected previous image to obtain an updated subject detection model, and perform subject detection on the current image based on the updated subject detection model, to obtain a target subject,
wherein the processor is configured to determine that the current image indicates the shaking state by:
performing difference processing on the current image and the previous image and performing binarization processing to obtain a binary difference image; calculation a sum of values of each pixel point in the binary difference image; and determining that the current image indicates the shaking state in cases that the sum is greater than a sum threshold; or
obtaining a pixel value of each pixel point comprised in the current image, and obtaining a pixel value of each pixel point comprised in the previous image; generating a first vector of pixel values for the current image based on the pixel value of each pixel point comprised in the current image, the first vector of pixel values representing a distribution of each pixel value of the current image; generating a second vector of pixel values for the previous image based on the pixel value of each pixel point comprised in the previous image, the second vector of pixel values representing a distribution of each pixel value of the previous image; determining a vector distance between the current image and the previous image based on the first vector of pixel values and the second vector of pixel values; and determining that the current image indicates the shaking state in cases that the vector distance is greater than a distance threshold.

14. The electronic device of claim 13, wherein the processor is configured to obtain the transformation matrix between the current image and the previous image in response to determining that the current image indicates the shaking state by:
obtaining a pair of target points from the current image and the previous image in cases that the current image indicates the shaking state; and
obtaining the transformation matrix between the current image and the previous image based on the pair of target points.

15. The electronic device of claim 14, wherein the pair of target points comprises at least one of a pair of tracking points or a pair of matching points; and
the processor is configured to generate the pair of tracking points by:
performing a same division on the current image and the previous image, to obtain sub-regions of the current image and sub-regions of the previous image;
extracting a target number of random points from each sub-region of the current image and each sub-region of the previous image respectively; and
generating the pair of tracking points based on the random points of each sub-region of the current image and the random points of each sub-region of the previous image; and
the processor is configured to generate the pair of matching points by:
extracting a feature point from the current image and extracting a corresponding feature point from the previous image; and
generating the pair of matching points based on the feature point of the current image and the corresponding feature point of the previous image.

16. The electronic device of claim 14, wherein the processor is further configured to:
obtain position information of each target point comprised in each pair of target points;
perform a difference calculation on position information of any two target points in a single image, to obtain a position difference value;
obtain one of the two target points of which the position difference value is smaller than a difference threshold as a removal target point; and
remove a pair of target points corresponding to the removal target point;
wherein the processor is configured to obtain the transformation matrix between the current image and the previous image based on the pair of target points by:
obtaining the transformation matrix between the current image and the previous image based on pairs of target points excluding the pair of target points corresponding to the removal target point.

17. The electronic device of claim 13, wherein the subject detection model comprises a first background detection model; and
the processor is configured to update the subject detection model based on the corrected previous image to obtain the updated subject detection model, and perform the subject detection on the current image based on the updated subject detection model, to obtain the target subject by:
updating the first background detection model based on the corrected previous image to obtain an updated first background detection model;
performing a background detection on the current image based on the updated first background detection model updated, to obtain a first background region of the current image; and
performing difference processing on the current image and the first background region of the current image to obtain a difference result, and determining the target subject of the current image based on the difference result.

18. A non-transitory computer readable storage medium, having a computer program stored thereon, wherein the computer program is executed by a processor to detect a subject by:
obtaining a current image and a previous image adjacent to the current image;
obtaining a transformation matrix between the current image and the previous image in response to determining that the current image indicates a shaking state;
correcting the previous image based on the transformation matrix to obtain a corrected previous image; and
updating a subject detection model based on the corrected previous image to obtain an updated subject detection model, and performing subject detection on the current image based on the updated subject detection model, to obtain a target subject,
wherein determining that the current image indicates the shaking state comprises:
performing difference processing on the current image and the previous image and performing binarization processing to obtain a binary difference image; calculation a sum of values of each pixel point in the binary difference image; and determining that the current image indicates the shaking state in cases that the sum is greater than a sum threshold; or
obtaining a pixel value of each pixel point comprised in the current image, and obtaining a pixel value of each pixel point comprised in the previous image; generating a first vector of pixel values for the current image based on the pixel value of each pixel point comprised in the current image, the first vector of pixel values representing a distribution of each pixel value of the current image; generating a second vector of pixel values for the previous image based on the pixel value of each pixel point comprised in the previous image, the second vector of pixel values representing a distribution of each pixel value of the previous image; determining a vector distance between the current image and the previous image based on the first vector of pixel values and the second vector of pixel values; and determining that the current image indicates the shaking state in cases that the vector distance is greater than a distance threshold.

* * * * *